3,453,273
4,5-DIHALO-1,2-DIHYDRO-3,6-PYRIDAZINEDIONES
William A. Bolhofer, Frederick, and James M. Sprague, Gwynedd Valley, Pa., assignors to Merck & Co., Inc., Rahway, N.J., a corporation of New Jersey
No Drawing. Continuation-in-part of application Ser. No. 367,584, May 14, 1964. This application Mar. 29, 1965, Ser. No. 443,179
Int. Cl. C07d 51/04, 99/02; A61k 27/00
U.S. Cl. 260—247.2                    19 Claims

ABSTRACT OF THE DISCLOSURE 4,5-dihalo-1,2-dihydropyridazinediones having substituents attached to each of the nitrogen atoms of the pyridazine nucleus and methods for preparing same, which comprises reacting dihalogenated maleic anhydride or the corresponding acid with an appropriately substituted hydrazine as the free base or in the form of an acid salt thereof, useful as gastric acid inhibitors.

---

This invention is concerned with pyridazinedione compounds and with methods for their preparation. This application is a continuation-in-part of our co-pending U.S. application Ser. No. 367,584, filed May 14, 1964 now abandoned.

While certain pyridazinedione compounds are known, particularly those that have been used as plant hormones, plant growth regulators or fungicides and herbicides, it has been found that a select group of heretofore unknown pyridazinedione compounds possesses the unique property of decreasing gastric acidity upon oral administration. Known compounds do not possess this unique activity or possess it to such a limited degree or with such severe undesired physiological side effects that the compounds are therapeutically and clinically useless or have very limited applicability.

The novel compounds of this invention that have been found to possess this property to a marked degree are 4,5-dihalo-1,2-dihydropyridazinedione compounds having a substituent other than hydrogen attached to each of the nitrogen atoms of the pyridazine nucleus. These compounds can be considered as having the general structure

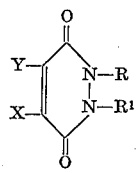

wherein each of the variables X and Y is a halogen, but not necessarily the same halogen; R and $R^1$ can be the same or dissimilar substituent and each represents (1) an unsubstituted or substituted aliphatic hydrocarbon being saturated or unsaturated and having a straight, branched or cyclic structure or having a combination of a cyclic structure with a straight and/or branched chain aliphatic hydrocarbon structure, (2) an unsubstituted or substituted carbocyclic aryl which can be monocyclic or bicyclic but preferably a monocarbocyclic aryl, or (3) an unsubstituted or substituted, saturated or mono- or poly-unsaturated heterocyclic group either monocyclic or bi- or tricyclic but preferably a monocyclic heterocycle having a 5-membered or 6-membered ring possessing one or more sulfur (S-), oxygen (O), or nitrogen (N) atoms or combinations thereof. The bicyclic and tricyclic heterocyclic groups can be composed of fused heterocyclic rings or fused heterocyclic and saturated or unsaturated carbocyclic rings.

The aliphatic hydrocarbon referred to in (1) above advantageously contains from 1 to 20 carbons, but preferably from 1 to 10 carbons, and when substituted contains one or more substituents selected from halogen, nitro, amino or substituted amino, carboxyl or esterified carboxyl, carbamoyl, acyl, hydroxyl or esterified or etherified hydroxyl, aryl-, alkyl- or aralkylthio, aryl-, alkyl- or aralkylsulfinyl, aryl- alkyl- or aralkylsulfonyl, cyano or thiocyano, unsubstituted or substituted monocarbocyclic aryl, or unsubstituted or substituted heterorcycle as defined in (3) above.

The carbocyclic aryl group referred to in (2) above can be bicyclic as an unsubstituted or substituted naphthyl, but preferably the unsubstituted naphthyl. Preferably, however, carbocyclic aryl is a monocarbocyclic aryl, such as phenyl, and if substituted contains one or more substituents selected from halogen, nitro, amino, substituted amino, hydroxyl or esterified hydroxyl, cyano, carbamoyl, carboxyl or esterified carboxyl, acyl, unsubstituted or substituted lower aliphatic hydrocarbon attached directly or attached through O, S, SO, or $SO_2$ to the phenyl moiety, the aliphatic moiety being the same as described under (1) above, monocyclic aryl attached directly to the phenyl moiety or attached through O, S, SO, or $SO_2$ to the phenyl moiety, monocyclic aryl-lower aliphatic attached directly to the phenyl moiety or attached through O, S, SO, or $SO_2$ to the phenyl moiety [wherein the lower aliphatic portion of the aryl-lower aliphatic substituent has the same structure as defined under (1) about ] and 5- or 6-membered heterocycles containing one or more O, N and/or S atoms.

The heterocyclic group referred to in (3) above preferably is an unsubstituted or substituted, saturated or mono- or polyunsaturated monocyclic heterocycle having a 5- or 6-membered ring possessing one or more S, O or N atoms or combinations thereof although bicyclic heterocyclic structures advantageously containing one or more S, O and/or N atoms are contemplated also. When substituted, one or more hydrogen atoms of the heterocycle is replaced by (A) an unsubstituted or substituted lower aliphatic hydrocarbon which can be linked directly or through an O, N, or S atom to the hetero nucleus and wherein the substituents that can be attached to the aliphatic hydrocarbon are as described under (1) above and illustrated under (1) hereinafter, or (B) an unsubstituted or substituted monocyclic carbocyclic aryl which can be linked directly or through an O, N or S atom to the hetero nucleus and wherein the substituent(s) advantageously are selected from halogen, lower alkyl, haloalkyl, lower alkoxy or alkylthio, amino and substituted amino.

It will be apparent from the above discussion that all hydrogen atoms of the pyridazinedione nucleus are replaced by substituent groups. The halogen atoms attached to the 4- and 5-position carbons can be the same or different halogens selected from chloro, bromo, iodo, and fluoro. Similarly, the substituent groups R and $R^1$ attached to the 1- and 2-position nitrogen atoms of the pyridazinedione nucleus can be the same or different.

(1) R and/or $R^1$=aliphatic hydrocarbon

For example, each of the variables R or $R^1$ can be the same or dissimilar aliphatic hydrocarbon that can be unsubstituted or substituted.

Unsubstituted lower aliphatic hydrocarbons can be (a) lower alkyl as methyl, ethyl, propyl, butyl, pentyl, hexyl, heptyl, octyl, decyl, dodecyl, hexadecyl, octadecyl, all being either straight or branched chain, (b) lower alkenyl, straight or branched chain, as vinyl, 1-t-butylvinyl, 1-propenyl, 1-ethylpropenyl, isopropenyl, allyl, 1-loweralkyl-1-propenyl, 1-loweralkyl-1-butenyl, 1-loweralkyl-1-heptenyl, 2,4-hexadienyl and the like, or (c) cycloalkyl or cycloalkenyl as cyclobutyl, cyclopentenyl, cyclopentadienyl, 1-, 2- or 3-cyclohexenyl, and the like. Combinations of the above unsubstituted lower aliphatic hydrocarbons are also contemplated as lower aliphatic-cycloaliphatic or cycloaliphatic-lower aliphatic, or lower aliphatic-cycloaliphatic-lower aliphatic groups which may be saturated or unsaturated, such as cyclopentylmethyl, 1-cyclopentylethyl, 2-cyclopentylethyl, 2-cyclopentylpropyl, 1- or 2-cyclohexylethyl or 2-cyclopentenylmethyl, 2-(2-cyclopentenyl)ethyl, 2-(2,2,3-trimethyl-3-cyclopentenyl)ethyl, 2-cyclohexyl-1-loweralkylethyl, 2 - (3-cyclohexenyl)propyl, 3-(2-cyclohexenyl)butyl and similar groups wherein the aliphatic and/or cycloaliphatic structures can be mono or polyalkyl substituted. The cycloaliphatic group can be attached directly to the pyridazinedione nucleus, as in 4-methylcyclohexyl, 3-methylcyclohexyl, 2-methylcyclohexyl, 4-methyl-2-cyclohexenyl and the like groups.

The substituted aliphatic hydrocarbon groups attached to either or both of the pyridazinedione nuclear nitrogen atoms can be, inter alia:

(A) Halogen substituted lower aliphatic hydrocarbons, as chloromethyl, dichloromethyl, trifluoromethyl, 3,3,3-trifluoropropyl, 2-chloroethyl, 2-bromoethyl, 2-fluoroethyl, pentafluoroethyl, 3-iodopropyl, 3-chloro-2-butenyl, 3,3-dichloro-2-methylallyl and the like;

(B) Nitro substituted lower aliphatic hydrocarbon can be illustrated by nitroalkyl, nitroalkenyl, nitrocycloalkyl, nitrocycloalkyl-alkyl, nitrocycloalkylalkenyl, and the like such as 2,2-dinitropropyl, 2-nitrocyclohexyl, and other nitro substituted aliphatic hydrocarbon wherein the aliphatic moiety has a straight or branched chain or cyclic structure or any combination thereof.

An especially advantageous substituted aliphatic hydrocarbon grouping is (C) one containing a basic substituent, such as an amino or substituted amino group which can, for illustrative purposes, be illustrated by one of the structures

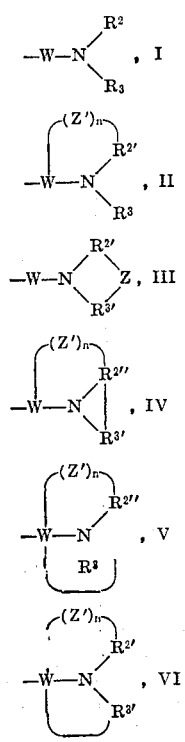

The aliphatic hydrocarbon moiety (W) can be any one of the variety of straight, branched, or cyclic aliphatic hydrocarbons, being unsaturated or saturated as well as combinations of said variants of the type discussed in (1) above. The basic substituent can be any one of a variety of amino, or substituted amino groups or their salts or quaternary ammonium derivatives. Thus, $R^2$ and $R^3$ respectively can be:

(a) Hydrogen.

(b) Lower aliphatic hydrocarbon as (i) saturated lower alkyl having 1–10 carbon atoms, as methyl, ethyl, propyl, butyl, pentyl, hexyl, heptyl, octyl, nonyl, decyl all having a straight, branched and/or cyclic structure as cyclopentyl, cyclohexyl, and the like, and (ii) unsaturated lower alkyl having 1–10 carbon atoms and having a straight, branched and/or cyclic structure as allyl, cyclohexenyl and 3,3-dimethylallyl.

(c) Substituted lower-aliphatic hydrocarbon as substituted lower alkyl wherein the substituent group preferably is hydroxy or esterified or etherified hydroxy, or an alkylthio, or tertiary amino group, such as 2-ethoxyethyl, 2-methoxypropyl, 3-hydroxypropyl, 3-acetoxypropyl, 2-(ethylthio)ethyl, 2 - (dimethylamino) - ethyl, 3-diethylaminopropyl, and 3-dimethylamino-2,2-dimethylpropyl.

(d) Carbocyclic aryl or substituted carbocyclic aryl especially carbomonocyclic aryl either unsubstituted or substituted phenyl, e.g. halophenyl as mono- or dichlorophenyl, mono- or dibromophenyl and the like; lower alkoxyphenyl wherein one or more alkoxy groups are attached to the phenyl nucleus such as methoxy, ethoxy, propoxy, butoxy and the like; lower alkylphenyl wherein one or more lower alkyl groups are attached to the phenyl nucleus as methyl, ethyl, n- or i-propyl, n-, i- or t-butyl and the like;

(e) Carbocyclic aryl-lower aliphatic hydrocarbon advantageously a carbomonocyclicaryl-lower alkyl wherein the carbomonocyclicaryl moiety is preferably an unsubstituted phenyl or halo-, alkyl- or alkoxy-substituted phenyl as described in (d) above and the lower alkyl moiety is straight, branched, cyclic or a combination of alicyclic with a straight or branched chain alkyl such as benzyl, phenethyl, 2-phenyl-1-methylethyl, α-methylbenzyl, p-chlorophenethyl, methoxybenzyl, methylbenzyl, 4-phenylcyclohexyl; and (f) $R^3$ additionally can represent an acyl group advantageously derived from a carboxylic acid or sulfonic acid as an acetyl, propionyl, isobutyryl group, methanesulfonyl, benzenesulfonyl, p-toluenesulfonyl, and similar groups;

$R^{2'}$, $R^{2''}$ and $R^{3'}$ represent lower aliphatic hydrocarbon groups, saturated or unsaturated and having a straight or branched chain or cyclic structure, and advantageously having 1 to 10 carbon atoms or carbocyclic aryl or carbocyclic aryl-lower alkyl, wherein the aryl moiety can be lower-alkyl substituted.

$R^{2'}$ and $R^{3'}$ are each bivalent, one valence of each being joined to the nitrogen atom and the second valence of each being attached to Z, Z' or W, or additionally the second valence of $R^{3'}$ can be attached to $R^{2''}$.

$R^{2''}$ is trivalent, one valence being attached to the nitrogen atom and the other two being attached to at least one of Z', $R^{3'}$ and W.

Z and Z' represent $CH_2$, O, S, SO, $SO_2$, $NR^4$ where $R^4$ is hydrogen, lower alkyl, or phenalkyl, and $n$ is zero or one.

Representative basic groups having structure I above are dimethylaminoalkyl,
diethylaminoalkyl,
dipropylaminoalkyl,
dioctylaminoalkyl,
N-methyl-N-ethylaminoalkyl
N-propyl-N-pentylaminoalkyl,
diisopropylaminoalkyl,
N-allyl-N-methylaminoalkyl,
N-cyclopentyl-N-methylaminoalkyl,
N-cyclohexyl-N-ethylaminoalkyl,
N-benzyl-N-methylaminoalkyl, N-phenethyl-N-methylaminoalkyl and the like or
N-phenyl-N-methylaminoalkyl,
N-(p-chlorophenyl)-N-methylaminoalkyl,
N-(o-methylphenyl)-N-methylaminoalkyl,
N-(p-methoxyphenyl)-N-methylaminoalkyl,
N-phenyl-N-benzylaminoalkyl,
N-(2-methoxypropyl)-N-methylaminoalkyl,
N-(2-dimethylaminoethyl)-N-methylaminoalkyl,
N-(3-acetoxypropyl)-N-ethylaminoalkyl,
N-(2-ethylthioethyl)-N-benzylaminoalkyl,
N-(p-chlorobenzyl)-N-ethylaminoalkyl,
N-(2,α-dimethylbenzyl)-N-ethylaminoalkyl,
N-(p-methoxybenzyl)-N-methylaminoalkyl,
2-acetamidoethylaminoalkyl and the like wherein the alkyl moiety of the disubstituted-aminoalkyl groups has a straight or branched chain or cyclic structure or any combination thereof as defined and illustrated under (1) above.

Representative basic groups having structure II above are 1-methyl-3-piperidylmethyl, 1-methyl-3-piperidyl, 4-methyl-2-morpholinylmethyl, 1 - methyl-3-octahydroindolyl, 1-ethyl-1,2,3,4-tetrahydro-3-quinolyl, 2-methyl-1,2,3,4-tetrahydro-4-isoquinolyl and the like.

Representative basic groups having structure III above are 1,2,3,4-tetrahydro-1-quinolylalkyl, 1,2,3,4-tetrahydro-2-isoquinolylalkyl, (1-pyrrolidinyl)alkyl, (mono- or polyalkyl substituted-1-pyrrolidinyl)alkyl, (1-piperidinyl)alkyl, (mono- or polyalkyl substituted-1-piperidinyl)alkyl, (4 - methyl - 1 - piperazinyl)alkyl, (mono - or polyalkyl-substituted - 1 - piperazinyl)alkyl, 4 - morpholinyl)alkyl, (mono- or polyalkylsubstituted-4-morpholinyl)alkyl, (4-thiomorpholinyl)alkyl, (mono- or polyalkylsubstituted-4-thiomorpholinyl)alkyl, (4 - thiomorpholinyl - 1 - oxo)alkyl, (mono - or polyalkyl substituted - 4 - thiomorpholinyl - 1 - oxo)alkyl, (4 - thiomorpholinyl - 1,1 - dioxo)-alkyl, (mono- or polyalkylsubstituted-4-thiomorpholinyl-1,1-dioxo)alkyl and similar groups wherein the alkyl moiety of the foregoing compounds has a straight or branched chain or cyclic structure or any combination thereof as defined in (1) above.

Representative of structure IV are quinuclidinyl, 1- and 3-hexahydropyrrolizinyl, 3- and 5-octahydroindolizinyl, 4-quinolizidinyl.

Representative of the structure V are the tropyl group or an N-alkyl-7-azabicyclo(2,2,1)heptane moiety.

Representative of structure VI are 3- and 4-quinuclidinyl, 8-hexahydropyrrolizinyl, 2- and 8-octahydroindolizinyl, 1- and 9a-quinolizidinyl.

Additional substituted aliphatic hydrocarbon groups that can be attached to either or both of the pyridazine-dione nuclear nitrogens (R and/or R¹) are aliphatic hydrocarbons having attached to at least one of its carbon atoms a (D) carboxyl, esterified carboxyl and carbamoyl or N-substituted carbamoyl group as carboxyalkyl, alkoxycarbonylalkyl as methoxycarbonylalkyl, ethoxycarbonylalkyl, N,N-dialkylaminoalkylcarbonylalkyl as [2-(N,N-diethylamino)ethoxy]carbonylalkyl, 3 - (N,N - dimethyl-amino)propoxycarbonylalkyl, carbamoylalkyl, methyla-minocarbonylalkyl, dimethylaminocarbonylalkyl, diethyl-aminocarbonylalkyl, N,N-dialkylaminoalkylaminocarbonylalkyl as (N,N-diethylaminoethyl)aminocarbonylalkyl, 3 - (N,N-dimethylamino) - 2 - methylpropylaminocarbonylalkyl, and the like wherein the alkyl moiety of the foregoing compounds has a straight or branched chain or cyclic structure or any combination thereof as defined in (1) above.

(E) Acyl substituted aliphatic hydrocarbon groups wherein the acyl substituent is derived from a lower fatty acid that itself can carry substituents as a disubstituted amino, halogen, phenyl, halophenyl, alkylphenyl or alkoxyphenyl attached to the aliphatic moiety of the fatty acid, these acyl substituents being exemplified by acetyl, propionyl, isobutyryl, phenylacetyl, tolylacetyl, mesitylacetyl, and similar acyl groups.

(F) Hydroxyl, esterified hydroxyl or etherified hydroxyl substituted aliphatic hydrocarbon groups, as hydroxylalkyl, esterified hydroxyalkyl wherein the esterifying group is the acyl residue of a lower carboxylic acid which can itself be substituted with disubstitutedamino, halo or alkoxy groups or groups as acetyl, dimethylamino- or diethylaminoacetyl and the like, chloroacetyl, chloropropinoyl and the like methoxy-acetyl, ethoxyproprionyl and the like or an etherified hydroxylalkyl wherein the etherifying group is the residue of an aliphatic, aromatic or araliphatic alcohol as the residue derived from methanol, ethanol, propanol, butanol, N,N-dialkylamino-alkanol as 2 - (N,N - diethylamino)ethanol, 2-(1-piperidinyl)ethanol, phenol or substituted (halo, alkyl, alkoxy) phenol, benzyl alcohol and the like. The alkyl moiety of the hydroxyalkyl, esterified hydroxyalkyl or etherified hydroxyalkyl is a lower aliphatic hydrocarbon moiety having a straight or branched chain or cyclic structure or any combination thereof as defined in (1) above; these groups can be exemplified by hydroxyethyl, hydroxypropyl, 3-hydroxy - 2 - methylpropyl, 1-(2-hydroxycyclopentyl)isopropyl, and the like.

(G) Alkyl-, aryl- or aralkylthio substituted aliphatic hydrocarbons, or their sulfinyl or sulfonyl-oxidation products, the alkyl as well as the aliphatic hydrocarbon moieties of the foregoing groups having a straight or branched chain or a cyclic structure or any combination thereof as defined in (1) above, and the aryl moieties being monocyclic carbocyclic aryl advantageously unsubstituted or substituted phenyl (the substituents being selected from ntiro, alkyl, alkoxy, halo), exemplified by 2-methylthio-ethyl, benzylthioethyl, 2-phenylthiovinyl, phenylthio-ethyl, p-tolylthioethyl, methylthiobenzyl and the sulfinyl and sulfonyl oxidation products thereof and similar groups.

(H) Cyano- or thiocyano substituted aliphatic hydrocarbons, wherein the aliphatic moiety is as described in (1) above, such substituents being exemplified by cyano-alkyl, as 2- or 3-cyanopropyl, 2- cyanoethyl, cyanomethyl, cyanocyclohexyl, or the thiocyano-analogs thereof as thiocyanomethyl and thiocyanoethyl, thiocyanopropyl, thiocyanocyclohexyl and the like;

(I) Monocarbocyclic aryl substituted aliphatic hydrocarbon groups wherein the monocarbocyclic aryl can be unsubstituted or substituted, said substituents being one or more groups selected from halogen, lower alkyl, halo-alkyl, hydroxyl, alkoxy, esterfied hydroxyl, carboxyl, esterified carboxyl, carbamoyl, alkyl-, aryl- or aralkylthio-aryl substituted aliphatic hydrocarbons or their sulfinyl or sulfonyl oxidation products, nitro, amino (unsubstituted and mono and disubstituted), cyano, acyl, phenyl or substituted phenyl (the substituents being the same as those identified in (2) above for attachment to the monocarbocyclic aryl group) and wherein the aliphatic hydrocarbon moiety is as defined in (1) above, these substituents being exemplified by phenylalkyl, mono- or polychlorophenyl-alkyl, mono- or poly-fluorophenylalkyl, iodophenylalkyl, bromophenylalkyl, nitrohalophenylalkyl, alkyl-halophen-ylalkyl, hydroxy-halophenylalkyl, alkoxy-halophenylalkyl, trifluoromethylphenylalkyl, ethylthiophenylalkyl, mono- di- or trimethylphenylalkyl, hydroxyphenylalkyl, mono- or poly-, methoxy-, ethoxy-, and/or propoxyphenylalkyl, o-, m-, p-, or polycarboxyphenylalkyl or their esterified derivatives derived by reaction with lower aliphatic alcohols, also (dialkylaminoalkoxy)carbonylphenyl-alkyl as (di-ethylaminoethoxy)carbonylphenyl-alkyl, carbamylphenyl-alkyl, methylaminocarbonylphenylalkyl, diethyaminocarbonylphenylalkyl, and other (dialkylaminoalkylamino)-carbonylphenyl - alkyls as (diethylaminoethylamino)car-bonylphenyl - alkyl, cyanophenylalkyl, acetylphenylalkyl, methylsulfonylphenylalkyl or other lower alkylsulfonyl-phenylalkyl, nitrophenalkyl, mono- or di-aminophenyl-alkyl, methylaminophenylalkyl, ethylaminophenylalkyl or other lower-alkylaminophenylalkyl, di-lower alkylamino-phenylalkyl as dimethylamino-, diethylamino-, N-methyl-N-ethylamino-, N-methyl-N-propylaminophenylalkyl, 1- piperidylphenylalkyl, and similarly substituted amino groups having the structure

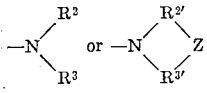

wherein the substituents (R and Z) are defined above, [alkylsulfonylamino]phenylalkyl, (acetylamino)phenylalkyl and similar groups, N-alkyl-N-arylaminophenylalkyl as N - methyl - N - phenylaminophenylalkyl and similar groups, biphenylalkyl, (methylphenyl)phenylalkyl, (chlorophenyl)phenylalkyl, (ethoxyphenyl)phenylalkyl, (nitrophenyl)phenylalkyl, (methoxyphenyl)phenylalkyl, (aminophenyl)phenylalkyl, (dialkylaminophenyl)phenylalkyl, (dialkylamino-alkylphenyl)phenylalkyl, and similar groups, wherein in each of the foregoing compounds the alkyl moiety has a straight or branched chain or cyclic structure or any combination thereof as defined in (1) above;

(J) Heterocyclic substituted aliphatic hydrocarbon groups that can be attached to the pyridazinedione nuclear nitrogen atom or atoms are those wherein the heterocycle is mono- or polynuclear as described under (3) above, advantageously having up to three fused rings, one or more of said rings containing one or more hetero atoms selected from S, O, and N. Illustrative of the heterocycles contemplated are mono-, di- or tri-cyclic heterocycles either saturated or unsaturated as furyl, tetrahydrofuryl, oxazolidinyl, oxazolyl, isoxazolyl, thienyl, thiazolyl, isothiazolyl, thiadiazolyl, pyrrolyl, pyrrolidinyl, pyrrolinyl, pyrazolyl, imidazolyl, triazolyl, pyranyl, dioxanyl, pyridyl, piperidinyl, pyridazinyl, pyrimidinyl, pyrazinyl, piperazinyl, triazinyl, morpholinyl, thiomorpholinyl, indolyl, phthalazinyl, quinazolinyl, pteridyl, benzoxazolyl, benzothiazolyl, benzothiazolinyl, benzimidazolyl, dibenzofuranyl and similar O, S and/or N-containing heterocycles.

The di- and tri-cyclic heterocycles advantageously are unsubstituted or one or more of the nuclear hydrogens can be replaced by a substituent selected from lower alkyl, di-substituted amino and (di-substituted amino)-alkyl.

The preferred heterocyclics are 5- or 6-membered monocyclic heterocyclic groups unsubstituted or substituted, saturated or mono- or poly-unsaturated and having one or more nuclear hetero atoms selected from O, S and N. One or more hydrogen atoms of the foregoing hetero nuclei can be replaced by one or more substituents selected from halo, lower aliphatic, alkoxy, alkylthio, aryl, arylthio, aralkyl, aralkylthio, acyl (derived from aliphatic, aromatic or araliphatic carboxylic acids), nitro, amino (especially disubstituted amino). These monocyclic heterocyclic substituted aliphatic groups representing R and/or $R^1$ can be exemplified by furylalkyl, tetrahydrofurylalkyl, thienylalkyl, methylthienylalkyl, oxazolidinylalkyl, oxazoylalkyl, isoxazoylalkyl, thiazolylalkyl, methoxythiazolylalkyl, isothiazolylalkyl, 1,3,4 - thiadiazolylalkyl, 5-benzylthio-1,3,4-thiadiazolylalkyl, 5-ethoxy-1,3,4-thiadiazolylalkyl, pyrrolylalkyl, triazolylalkyl, 2-pyrrolidinylalkyl, 3 - pyrrolidinylalkyl, pyrrolinylalkyl, pyrazolylalkyl, 2 - imidazolylalkyl, 4 - (or 5-)trifluoromethyl - 2 - imidazolylalkyl, 4-(or 5-)chloro-2-imidazolylalkyl, 4-(or 5-)bromophenyl-2-imidazolylalkyl, 2-pyrimidinylalkyl and mono- and poly-alkyl-substituted-2-pyrimidinylalkyl or mono- and polyalkoxy-substituted-2-pyrimidinylalkyl, 3-pyridylalkyl and [mono- and polyalkyl-substituted-2-pyridyl]alkyl or [mono- and polyalkoxy-substituted-2-pyridyl]alkyl, [2-(or 3-)morpholinyl]alkyl, [2-(or 3-)thiomorpholinyl]alkyl, [2 - (or 3-)piperazinyl]alkyl, pyranylalkyl, dioxanylalkyl, piperidinylalkyl, pyridazinylalkyl, pyrazinylalkyl, triazinylalkyl, and similar O, S and/or N-containing 5- or 6-membered monocyclic heteroaliphatics, wherein the alkyl moiety of the foregoing compounds has a straight or branched chain or cyclic structure or any combination thereof as described in (1) above.

While the unsubstituted as well as the substituted aliphatic hydrocarbon groups representing R and/or $R^1$ have been illustrated by many examples, the groups specifically identified do not completely and exhaustively represent all groups contemplated because, as was previously mentioned in (1) above, one or more of the hereinbefore identified substituents can be attached to the aliphatic hydrocarbon. As these multiple similarly or dissimilarly substituted aliphatic hydrocarbon groups are readily visualized by those skilled in the art, particularly in the field of hydrazine chemistry, further illustration of such groups is not considered essential for a complete understanding of the 1-R-2-$R^1$-4,5-dihalo-1,2-dihydro-3,6-pyridazinedione compounds of this invention, wherein R and/or $R^1$ are aliphatic groups of the type described in (1) above.

(2) R and/or $R^1$=carbocyclic aryl

The carbocyclic aryl group attached to either or both of the pyridazinedione nuclear nitrogen atoms preferably is monocyclic as unsubstituted or substituted phenyl, but can also be bicyclic such as the substituted but preferably the unsubstituted naphthyl.

The monocyclic carbocyclic aryl preferably is phenyl or substituted phenyl. The substituted phenyl group can contain one or more similar or dissimilar substituents selected from:

(A) Halogen, as chloro, bromo, fluoro and iodo illustrated by o-, m- and p-chlorophenyl, o-, m-, and p-fluorophenyl, 3-chloro-o-tolyl, o-, m-, and p-bromophenyl, o-, m-, and p-iodophenyl, 2,4-dichlorophenyl and similar groups;

(B) Nitro, illustrated by p-nitrophenyl, 2,4-dinitrophenyl, 2 - methyl - 4 - nitrophenyl, 4-nitro-2,5-xylyl and similar groups;

(C) Amino or substituted amino substituents having the structures

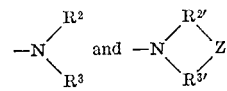

which are defined under (1) above, illustrated by p-methylaminophenyl, p - dimethylaminophenyl, methylbenzylaminophenyl, 4 - diethylaminophenyl, acetamidophenyl, N-methylacetamidophenyl, methanesulfonamidophenyl, benzenesulfonamidophenyl, (1-piperidyl)phenyl, (4-morpholinyl)phenyl, (4-thiomorpholinyl)phenyl, and similar groups;

(D) Hydroxyl or etherified or esterified hydroxyl that can be illustrated by p-hydroxyphenyl, methoxyphenyl or polymethoxyphenyl, ethoxyphenyl, propoxyphenyl, isopropoxyphenyl, benzyloxyphenyl, dialkylaminoalkoxyphenyl as 2-(4-morpholinyl)ethoxyphenyl, N,N-dimethylaminopropoxyphenyl, (N,N - diethylaminoethoxy)phenyl, 4-acetoxyphenyl, (chloroacetoxy)phenyl, dialkylaminoacyloxyphenyl as (dimethylaminoacetoxy)phenyl, benzoyloxyphenyl, and similar groups;

(E) Cyano as o-, m-, and p-cyanophenyl, 2-methyl-4-cyanophenyl, and similar groups;

(F) Acyl as the residue of a lower carboxylic acid, p-acetylphenyl, p-butyrylphenyl, p-(phenylacetyl)phenyl, dimethylaminoacetylphenyl and similar groups;

(G) Carboxyl, esterified carboxyl, carbamyl or N-substituted carbamyl as p-carbamylphenyl, N-ethylaminocarbonylphenyl, p-N,N-dimethylaminocarbonylphenyl, N-phenyl - N - methylaminocarbonylphenyl, (N,N-dialkylaminoalkyl)aminocarbonylphenyl as [(N,N - diethylaminoethyl)aminocarbonyl]phenyl, 2-(N-methyl-N-benzylamino)ethylaminocarbonylphenyl, carboxyphenyl 2-hydroxy-3-carboxyphenyl, p-ethoxycarbonylphenyl, methoxycarbonylphenyl, benzyloxycarbonylphenyl, diethylaminoethoxycarbonylphenyl, and similar groups (H) Lower aliphatic hydrocarbon substituted phenyl groups the aliphatic substituent being the same as described under (1) above and attached directly or attached through O, S, SO or SO$_2$ to the phenyl. These can be illustrated as alkylphenyl where the alkyl is straight, branched or cyclic and saturated or unsaturated, having from 1 to 20 carbon atoms, but preferably from 1 to 10 carbons as methylphenyl, isopropylphenyl, t. butylphenyl, cyclohexylphenyl, vinylphenyl, allylphenyl, propenylphenyl and similar groups, chloromethylphenyl, trifluoromethylphenyl, chloroethylphenyl, dimethylaminomethylphenyl, (4-morpholinylmethyl)phenyl (carboxymethyl) phenyl, (ethoxycarbonylmethyl)phenyl, (diethylaminoethoxycarbonylmethyl)phenyl, (hydroxyethyl)phenyl, (methoxymethyl)phenyl, acetoxymethylphenyl, methyl thiomethylphenyl and its sulfinyl and sulfonyl oxidation products, phenylthiomethylphenyl and its sulfinyl and sulfonyl oxidation products, benzylthiomethylphenyl and its sulfinyl and sulfonyl oxidation products, (cyanomethyl) phenyl, (o-, m-, and p-chlorobenzyl)phenyl, (o-, m-, and p-methoxybenzyl)phenyl, (o-, m-, and p-methylbenzyl)phenyl, benzylphenyl, [(4-trifluoromethyl)benzyl]phenyl, lower-aliphaticoxyphenyl, lower-aliphaticthiophenyl and the sulfinyl and sulfonyl oxidation products thereof, wherein the aliphatic moiety is as defined in (1) above, such as methoxyphenyl, ethoxyphenyl, methylthiophenyl, ethylthiophenyl, methylsulfinylphenyl, methylsulfonylphenyl, benzyloxyphenyl, benzylthiophenyl, (p-chlorobenzylsulfinyl)phenyl, benzylsulfonylphenyl and similar groups, (2-thiazolylmethyl)phenyl, furfurylmethylphenyl, imidazolylmethylphenyl, oxazolylmethylphenyl, pyridylmethylphenyl and similar groups;

(I) Monocyclic aryl, preferably unsubstituted or substituted phenyl which can be attached directly or attached through O, S, SO or SO$_2$ to the carbocyclic aryl phenyl. These groups can be illustrated by biphenyl, or substituted biphenyl as (p-tolyl)phenyl, (4-chlorophenyl) phenyl, (methoxyphenyl)phenyl, (dimethylaminophenyl) phenyl, [(dimethylaminomethyl)phenyl]phenyl and similar groups, carbocyclic aryloxyphenyl, carbocyclic arylthiophenyl and the sulfinyl and sulfonyl oxidation products thereof wherein the carbocyclic aryl moiety is as defined in (2) above, such as phenoxyphenyl (p-chlorophenoxy)phenyl, (p-chlorophenylthio)phenyl, phenylsulfinylphenyl, phenylsulfonylphenyl.

While the unsubstituted as well as the substituted carbocyclic aryl groups representing R and/or R$^1$ have been illustrated by many examples, the groups specifically identified do not completely and exhaustively represent all groups contemplated because, as was previously mentioned in (2) above, one or more of the hereinbefore identified substituents can be attached to the nucleus of the carbocyclic aryl group. As these multiple similarly or dissimilarly substituted carbocyclic aryl groups are readily visualized by those skilled in the art, particularly in the field of hydrazine chemistry, further illustration of such groups is not believed needful for a complete understanding of the 1-R-2-R$^1$-4,5-dihalo-1,2-dihydro-3,6-pyridazinedione compounds of this invention wherein R and/or R$^1$ are carbocyclic aryl groups of the type described in (2) above.

R and/or R$^1$=heterocyclic group(s)

The heterocyclic group attached to either or both of the pyridazinedione nuclear nitrogens can be monocyclic or fused bi- or tricyclic groups of the types described under (3) above.

The bi- and tricyclic heterocyclic groups preferably contain one or more nuclear N, O and S atoms in one or more of the cyclic components of the nucleus such as unsubstituted or substituted (lower alkyl and/or amino substituted) quinazolinyl, phthalazinyl, pteridyl, indolyl, benzothiazolyl, benzothiazolinyl, benzimidazolyl, benzoxazolyl, dibenzofuranyl, and similar bi- and tricyclic heterocyclic groups.

The preferred heterocyclic groups are 5- or 6-membered monocyclic heterocyclic groups unsubstituted or substituted and saturated or mono- or poly-unsaturated and having one or more nuclear hetero atoms selected from O, S and N. The 5-membered heterocyclic groups can be illustrated by furyl, tetrahydrofuryl, thienyl, thiazolyl, isothiazolyl, thiadiazolyl, pyrrolidinyl, pyrrolinyl, pyrrolyl, imidazolyl, pyrazolyl, triazolyl, oxazolyl, isoxazolyl, oxazolidinyl, and similar O, S and N-containing 5-membered hetero groups as well as their mono- or polysubstituted derivatives, the substituent groups preferably being lower aliphatic, or phenyl, substituted phenyl and phenylalkyl groups as illustrated by 5-phenylthiadiazolyl, 5-benzylthiazolyl, 4- or 5-p-bromophenylimidazolyl, 2,5-dimethylpyrrolidinyl, 2-methylfuryl, 1-cyclohexylimidazolyl, 3-methylisothiazolyl, 5-phenylisoxazolyl, 1-phenylpyrazolyl, 1-benzylpyrrolyl and similar groups.

In addition, the heterocyclic group(s) can be 6-membered, O, S and N-containing heterocycles either unsubstituted or substituted (the substituents preferably being one or more lower alkyl, halo-lower alkyl, alkoxy, alkylthio, aryl and aralkyl groups) as illustrated by the unsubstituted piperidinyl, pyridyl, piperazinyl, pyridazinyl, pyrimidinyl, pyrazinyl, triazinyl, morpholinyl, thiomorpholinyl, dioxanyl, pyranyl, and similar O, S and N-containing 6-membered rings as well as substituted derivatives thereof illustrated by 2,6-dimethyl-5-pyridyl, 4,5,6-trimethyl-2-pyrimidinyl, 4-ethyl-6-methyl-2-pyrimidinyl and other lower alkyl substituted pyrimidinyl groups, 4,6-dimethoxy-2-pyrimidinyl, 4,6-dimethylthio-2-pyrimidinyl, 4-trifluoromethyl - 2 - pyrimidinyl, 2 - trifluoromethylpyrimidinyl, 2-benzylpyrimidinyl, 4-methyl-2-(m-dioxanyl), 4,5-dimethyl-2-(m-dioxanyl), 4,6-dimethyl-s-triazinyl, 6-methoxypyridazinyl, 4-phenyltriazinyl.

While the unsubstituted as well as the substituted heterocyclic groups representing R and/or R$^1$ have been illustrated by representative examples, the groups specifically identified do not completely and exhaustively represent all groups contemplated because, as was previously mentioned in (3) above one or more of the hereinbefore identified substituents can be attached to the heterocyclic nucleus. As these multiple similarly and dissimilarly substituted heterocycles are readily visualized by those skilled in the art, particularly in the field of hydrazine chemistry, further illustration of such groups is not believed needful for a complete understanding of 1-R-2-R$^1$-4,5-dichloro-1,2-dihydro-3,6-pyridazinedione compounds of this invention wherein R and/or R$^1$ represent heterocyclic groups of the type described in (3) above.

It will be apparent, also, that R can be an aliphatic hydrocarbon of the type described under (1) above, and R$^1$ either an aliphatic hydrocarbon (1), a carbocyclic aryl (2) or a heterocycle (3) or R can be a carbocyclic aryl (2) and R$^1$ be a group (1), (2), or (3) substituent, or R can be a heterocycle (3) and R$^1$ a group (1), (2) or (3) substituent.

A preferred subgroup of compounds are those wherein X and Y are halogen and one of the variables R or R$^1$ is an unsubstituted lower aliphatic hydrocarbon and the other R is unsubstituted or substituted lower aliphatic hydrocarbon, as in (1) above, an unsubstituted or substituted monocarbocyclic aryl as in (2) above, or an unsubstituted or substituted 5- or 6-membered O, S and/or N-containing heterocyclic as in (3) above. Within this subgroup those compounds wherein X and Y are halogen, one of R or R$^1$ is an unsubstituted lower aliphatic hydrocarbon having from 1 to 6 carbon atoms and the other R is a lower aliphatic hydrocarbon having at least one substituent attached thereto which is a basic substituent, are especially effective as gastric acidity reducing agents.

The novel compounds of this invention advantageously can be prepared by reacting dihalogenated maleic anhydride or the corresponding acid with the appropriately substituted hydrazine as the free base or in the form of an acid salt thereof. The reaction preferably is carried out in an inert gas atmosphere. When the acid salt of the hydrazine is used, the anionic moiety should preferably be less strongly nucleophilic than the halogen atoms of the dihalomaleic anhydride.

The hydrazine in addition to being 1,2-disubstituted may also be in the form of its mono- or diacyl derivative. The acyl groups in the course of reaction are eliminated by cleavage.

While neither heat nor solvent is required, the reaction can be performed more efficiently in the presence of a solvent, which may be organic or inorganic, as acetic acid, acetonitrile, water and other conventional solvents, and with heating to 100–150° C.

In the cyclization reaction, the addition of an alkali metal salt of a weak acid, such as sodium acetate, may be efficacious as a buffering agent and catalyst, but has no effect on the structure of the product formed.

Although the specific pyridazinediones of this invention arising from the reaction of a dihalomaleic anhydride and a 1,2-disubstituted hydrazine are conveniently prepared in one step without isolation of intermediate reaction products from the anhydride and hydrazine, those skilled in the art will recognize that the corresponding substituted maleamic acids may be the first product formed; this intermediate then is cyclized to the pyridazinedione by permitting the reaction to proceed to completion.

As illustrative of the aforedescribed process, the dichloromaleamic acid (derived from 1,2-dicyclohexyl hydrazine and dichloromaleic anhydride) is prepared and isolated in a separate reaction and this then is cyclized to the pyridazinedione by moderate heating in the presence of a solvent.

The 1,2-disubstituted-pyridazinediones can also be prepared in certain instances by subjecting a pyridazinedione of the type having hydrogen as the substituent on one of the nitrogen atoms to substitution reactions as for example an alkylation reaction employing as alkylating agent R—X wherein R is as defined above and X is a displaceable group especially a sulfate or halide. This reaction preferably is carried out with moderate heating up to reflux temperatures. The alkylating agent itself can serve as a solvent or, if desired, other inert solvents can be employed, as ethers, dimethylformamide, hydrocarbons and the like. In this way a 1-substituted-4,5-dihalo-1,2-dihydro-3,6-pyridazinedione can be converted to a 1,2-disubstituted - 4,5-dihalo-1,2-dihydro-3,6-pyridazinedione. Depending on the pyridazinedione undergoing substitution and the choice of substituting agent, the substituents on the two nitrogen atoms can be made the same or different. The 1 - substituted-4,5-dihalo-1,2-dihydro-3,6-pyridazinedione is prepared from a monosubstituted hydrazine and a dihalomaleic acid or anhydride.

In addition, certain of the pyridazinedione products of this invention, after being formed from the dihalomaleic acid or anhydride and the disubstituted hydrazine, can be further modified by additional chemical reactions to vary the substituent groups, thus yielding products which may be more readily prepared by this method than by the anhydride-hydrazine reaction. The halo substituents can be exchanged by reacting the dihalopyridazinedione with a hydrohalide or a metal halide (especially an alkali metal halide) in which the halogen differs from and preferably is more nucleophilic than that in the pyridazinedione. The substituents on the nitrogen atoms can be modified also, as by esterification or acylation and the like.

The novel compounds of this invention which carry an amino substituent react with alkylating agents such as a primary, secondary or tertiary alkyl halide, an aralkyl halide or an alkyl ester of sulfuric or a sulfonic acid to yield the corresponding quaternary ammonium compounds. The reaction can be carried out in an inert solvent such as benzene or dioxane or it can be carried out without solvent by admixing the reagents in equivalent amount or with the alkylating agent in excess and thereby serving as the solvent.

The dihalomaleic acids or the corresponding anhydrides are commercially available or can be prepared by procedures described in the chemical literature.

For the purpose of reaction with a dihalomaleic anhydride or acid as hereinafter set forth in the examples, the hydrazine salts and corresponding free bases regardless of physical condition are considered to be equivalent. Crystalline hydrazine base, distilled liquid hydrazine base, non-distilled liquid hydrazine base, crystalline hydrazine salts and non-crystalline hydrazine salts react with the dihalomaleic acid or anhydride to yield the dihalodihydropyridazinedione.

It is preferable, however, that the anionic constituents of the hydrazine salt (when a salt is used) be less nucleophilic than the halo atoms of the dihalomaleic anhydride or acid under the conditions of the cyclization reaction.

Specifically, all hydrazines described in the intermediate preparation section and tables react satisfactorily with dihalomaleic anhydride or acid whether in the form of the free base or hydrochloride salt.

The novel compounds of this invention in addition to having neutral substituents may also possess acidic or basic substituents. For those having acidic substituents, the products may be obtained as the free acid or as the equivalent salt of a suitable metallic or organic base. Likewise, the pyridazinediones having a basic substituent may be obtained in the form of acid addition salts as well as the free base. The acid addition salts may be obtained by adding the desired inorganic or organic acid such as hydrochloric, sulfuric, oxalic, tartaric, citric or p-toluenesulfonic acids and the like acids at an appropriate stage of the reaction workup which may or may not involve a preliminary isolation of the compound as the free base. There are also circumstances under which it is desirable to prepare the acid addition salt directly from the reaction mixture, for purification, for example, before converting it to the free base for subsequent use. It is obvious that the use of an acid addition salt of a hydrazine in the reaction with the dihalomaleic anhydride or acid makes possible the isolation of the corresponding acid addition salt of the pyridazinedione without adding additional exogenous acid provided, of course, that the acid formed in situ from the hydrazine salt has not been neutralized by a buffering or catalytic agent or lost in some way such as by volatilization.

The examples are illustrative of the equivalency of hydrazine salts and free bases in the cyclization reaction with the maleic anhydride or acid, and they are also illustrative of the various methods of working up the reaction mixture to obtain the product in free or salt forms where such are possible and also the interconversions thereof.

The hydrazine compounds employed in the synthesis of the novel compounds of this invention can be prepared by the various known procedures that have been described in the chemical literature. One method involves acylating preferably with a carboxylic acid halide or anhydride both nitrogen atoms of a monosubstituted hydrazine ($RHN-NH_2$) to obtain the diformyl, dibenzoyl, dicarbobenzyloxy or other diacyl derivative which is caused to react with an alkylating agent such as an $(R^1)_2$-sulfate, $R^1$-halide or other reactive derivatives thereof to introduce the desired $R^1$ substituent on the hydrazine nitrogen and then removing the acyl groups by appropriate methods such as basic hydrolysis, acid hydrolysis, hydrogenation and the like. A modification of this method consists of the alkylation of a 1,2-diacylhydrazine (no other substituents) with the aforementioned alkylating agents. If the alkylation is carried out with two moles of alkylating agent per mole of diacyl hydrazine, then a symmetrically disubstituted diacyl hydrazine results from which the acyl groups may be removed as described above to obtain the symmetrically disubstituted hydrazine. In addition, dissimilar alkylating agents may be used successively in quantities equimolar with the diacyl hydrazine to produce unsymmetrically disubstituted hydrazines.

Another method for preparing hydrazines of the structure

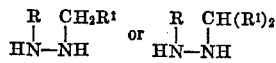

employs a 1-R-2-alkylidene hydrazine as the starting material. This is obtained by reacting a monosubstituted hydrazine (RHN—NH$_2$) with a substituted or unsubstituted aldehyde (R$^1$—CHO) or ketone (R$^1$COR$^1$). The double bond in the alkylidene hydrazine can then be reduced in a number of ways both chemical, for example, with lithium aluminum hydride and catalytic, for example, with platinum catalyst at three atmospheres hydrogen pressure in acetic acid. Various modifications may be made in the reaction conditions and intermediates which in no way affect the structure of the final product. For example, before catalytic hydrogenation the alkylidene hydrazine may be acylated and then after reduction is complete the acyl group removed by hydrolysis to yield the disubstituted hydrazine.

The pyridazinedione compounds of this invention are unique among pyridazinediones in that they are effective inhibitors of gastric acid secretion. They are also unique among other types of compounds heretofore used for control of gastric acid. The preferred products heretofore and currently used to control gastric acidity are mainly either anticholinergic agents or antacids. The anticholinergic agents have the disadvantage in that they act by or through the nervous system by blocking the nerve impulses to the cells of the gastric mucosa responsible for secretion of acid. Because of their affect on the nervous system, the anticholinergic agents are non-specific, additionally affecting other secretory mechanisms of the body as well as other body functions dependent in whole or in part on stimulation by the nervous system. The antacid compounds on the other hand have limited effectiveness as they act only to neutralize the acid after it has been secreted into the stomach and furthermore have a very short duration of activity.

The pyridazinedione compounds of this invention do not act by either of the above mechanisms and thus afford a new approach to acid inhibition as they control acid production at the gastric mucosa cellular level. Pharmacological studies provide strong evidence that the pyridazinediones of this invention effect inhibition at the enzyme level and in addition are effective in inhibiting histamine stimulated gastric secretion, an important property not shared with other types of gastric acid inhibitors. The pyridazinediones also will block food stimulated gastric secretion. It has also been found as another feature of this invention that the pyridazinediones are superior to atropine in preventing formation of ulcers in rats made ulcer-prone by ligating the pyloris end of their stomachs, a procedure commonly employed in producing such lesions.

The novel compounds of this invention are relatively non-toxic at therapeutic levels and effectively inhibit acid secretion for a period of hours or even days depending upon the dose administered. By individualizing the dose it is possible to reduce the gastric acidity to normal levels if this should be considered advisable. In addition, because of the long period over which the pyridazinediones act, they are uniquely effective in inhibiting the high nocturnal secretions found in peptic ulcer patients.

While an effective dose will vary from compound to compound and on individual requirements, generally the compounds of this invention will be found effective when orally administered at a dosage of from about 50 mg. or more adjusted to the patient's requirement and with respect to the potency of the particular compound administered. As the 24 hour oral LD$_{50}$ in mice was found to be within the range of from 15 to 50 mg./kg., the effective dosage is seen to have a very favorable therapeutic ratio.

Because of the long duration of activity of the pyridazinedione compounds of this invention, they have special value in the prophylaxis and treatment of peptic ulcers.

As the compounds are effective upon oral administration, they can be compounded in any suitable oral dosage form, as in tablet, capsule, suspension or other liquid or solid form that can be prepared by methods well known in the art, as for example, admixing with a suitable quantity of lactose and encapsulating. While the compounds also are active upon parenteral administration, this route is not preferred over the oral.

The following examples illustrate methods used for preparing the novel pyridazinedione compounds of this invention. It is to be understood, of course, that the examples are not to be considered limitative as the compounds could be prepared by other methods. Where details for the preparation of the starting material are not given, they are either readily available commercially or their preparation is described in the literature. The details of preparation of all new reactants is supplied.

EXAMPLE 1

1,2-dimethyl-4,5-dichloro-1,2-dihydro-3,6-pyridazinedione

To dichloromaleic anhydride (25.0 g., 0.15 mole) dissolved in glacial acetic acid (200 ml.), is added 1,2-dimethylhydrazine dihydrochloride (20.0 g., 0.15 mole). The mixture is heated at reflux for four hours and the solvent then removed over a steam bath under reduced pressure. The yellow solid residue obtained is recrystallized from diethyl ketone to give a 77.5% yield of 1,2-dimethyl - 4,5 - dichloro - 1,2 - dihydro - 3,6 - pyridazine dione, M.P. 192.5–195.5° C. Additional recrystallizations from diethyl ketone raises the melting point to 194.5–196° C.

EXAMPLE 2

1,2-dimethyl-4,5-dichloro-1,2-dihydro-3,6-pyridazinedione

A 1-liter, 2-necked flask is equipped with a nitrogen inlet tube and reflux condenser, the open end of which is protected from the atmosphere with a soda lime drying tube. The system is flushed with dry nitrogen and then a slow stream of nitrogen is admitted during the reaction period. The flask is charged with dichloromaleic anhydride (0.15 mole) in glacial acetic acid (200 ml.) to which 1,2-dimethylhydrazine (0.15 mole) has been added. The reaction mixture is refluxed for four hours, the solvent removed and the yellow residue worked up as described in Example 1, to give a 73% yield of 1,2-dimethyl-4,5-dichloro-1,2-dihydro-3,6-pyridazinedione, having the same properties given in Example 1.

EXAMPLE 3

1,2-dimethyl-4,5-dibromo-1,2-dihydro-3,6-pyridazinedione

A solution of 1,2-dimethylhydrazine dihydrochloride (2.64 g., 0.02 mole) in water (20 ml.) is heated to boiling and dibromomaleic acid (5.48 g., 0.02 mole) is added. Boiling, open to the atmosphere, is continued for three hours, more water being added as required to maintain the original volume of solution. The yellow solid that separates is removed by filtration and recrystallized from aqueous alcohol to give an 88% yield of 1,2-dimethyl-4,5-dibromo-1,2-dihydro-3,6-pyridazinedione in the form of a yellow solid, M.P. 209–211° C.

EXAMPLE 4

1-isopropyl-2-phenyl-4,5-dibromo-1,2-dihydro-3,6-pyridazinedione

By replacing the hydrazine employed in Example 3 by an equimolecular quantity of 1-isopropyl-2-phenyl-hydrazine dihydrochloride and following substantially the same procedure described in Example 3, there is obtained a 62% yield of 1-isopropyl-2-phenyl-4,5-dibromo-1,2-dihydro-3,6-pyridazinedione which after recrystallization from ethanol melts at 182–183° C.

EXAMPLE 5

1-isopropyl-2-(2-hydroxyethyl)-4,5-dichloro-1,2-dihydro-3,6-pyridazinedione

A solution of dichloromaleic anhydride (3.34 g., 0.02 mole) and 1-isopropyl-2-(2-hydroxyethyl)hydrazine (2.36 g., 0.02 mole) [prepared as described in Intermediate Preparation 8] in acetonitrile (50 ml.) is placed in a 100 ml., 2-necked flask and the air displaced with an atmosphere of nitrogen as described in Example 2. After refluxing for four hours, the reaction mixture is allowed to stand at room temperature overnight. The solvent then is removed by distillation under reduced pressure, the residue taken up in chloroform and water and the sodium carbonate is added to saturation. The mixture is filtered, the chloroform layer is dried over sodium sulfate and the solvent removed by evaporation. A 3.2 g. yield of 1-isopropyl-2-(2-hydroxyethyl)-4,5-dichloro-1,2-dihydro-3,6-pyridazinedione is obtained, which, after recrystallization from n-butyl chloride, melts at 133.5–135° C.

EXAMPLE 6

1-isopropyl-2-(2-diethylaminoacetoxyethyl)-4,5-dichloro-1,2-dihydro-3,6-pyridazinedione hydrochloride Treatment of N,N-diethylglycine hydrochloride (3.0 g., 0.018 mole) with thionyl chloride (5 ml.) in chloroform (10 ml.) at reflux for 15 minutes gives N,N-diethylglycyl chloride hydrochloride which separates as a yellow solid upon removing the excess thionyl chloride under reduced pressure. The acid chloride is dissolved in chloroform (75 ml.) and 1-isopropyl-2-(2-hydroxyethyl)-4,5-dichloro-1,2-dihydro-3,6-pyridazinedione from Example 5 (2.0 g., 0.0075 mole) is added. The dark yellow solution is heated at reflux for 4 hours and cooled. The cooled solution is concentrated under reduced pressure to a gum which is dissolved in water (25 ml.) and the aqueous solution washed with ether and made basic with excess sodium carbonate. The oil which separates is extracted into ether, the ether extract washed with saturated sodium bicarbonate and water, dried, filtered through charcoal, and concentrated under reduced pressure to give 1.25 g. of orange oil. An ether solution of the oil is treated with ethanalic hydrogen chloride to give 1.27 g. of crude 1-isopropyl-2-(2-diethylaminoacetoxyethyl)-4,5-dichloro-1,2-dihydro-3,6-pyridazinedione hydrochloride. Two recrystallizations from diethyl ketone give 0.61 g. (20% yield) of the product in the form of a pale yellow solid, M.P. 158–160° C. Further recrystallization raises the melting point to 162.5–163.5° C.

EXAMPLE 7

1-isopropyl-2-(2-acetoxyethyl)-4,5-dichloro-1,2-dihydro-3,6-pyridazinedione

Treatment of 1-isopropyl-2-(2-hydroxyethyl)-hydrazine (23.64 g., 0.2 mole) with 2,3-dichloromaleic anhydride (33.39 g., 0.2 mole) in glacial acetic acid (325 ml.) according to Example 2 gives 1-isopropyl-2-(2-acetoxyethyl)-4,5-dichloro-1,2 - dihydro - 3,6 - pyridazinedione. After recrystallization from ethanol there is obtained 23.8 g. (39% yield) of the product in the form of a yellow solid, M.P. 80.5–83.5° C. Repeated recrystallization raises the melting point to 81.5–83.5° C.

EXAMPLE 8

1-isopropyl-2-(2-chloroacetoxyethyl)-4,5-dichloro-1,2-dihydro-3,6-pyridazinedione To a solution of 1-isopropyl-2-(2-hydroxyethyl)-4,5-dichloro-1,2-dihydro-3,6-pyridazinedione from Example 5 2.67 g., 0.01 mole) in anhydrous benzene (25 ml.) is added chloroacetyl chloride (10 ml.). The solution is heated at reflux for 2 hours and then concentrated under reduced pressure. The residual liquid is taken up in ether and the ether solution washed with saturated sodium carbonate solution and water. The dried ether solution is concentrated under reduced pressure to give 2.85 g. of oily, yellow solid. Two recrystallizations from methanol with Dry Ice-acetone cooling gave 2.10 g. (61% yield) of 1-isopropyl-2-(2-chloroacetoxyethyl) - 4,5 - dichloro-1,2-dihydro-3,6-pyridazinedione in the form of a pale yellow solid, M.P. 67–69° C. Further recrystallization raises the melting point to 68.5–70° C.

EXAMPLE 9

1,2-dimethyl-4-bromo-5-chloro-1,2-dihydro-3,6-pyridazinedione

To bromochloromaleic anhydride (31.7 g., 0.15 mole) dissolved in glacial acetic acid (200 ml.) is added 1,2-dimethylhydrazine dihydrochloride (20 g., 0.15 mole). The mixture is heated at reflux for 4 hours and the solvent then removed under reduced pressure. The residue is crystallized from ethanol to yield approximately 75% of the 1,2-dimethyl-4-bromo-5-chloro-1,2 - dihydro - 3,6-pyridazinedione.

EXAMPLE 10

1,2-dimethyl-4,5-difluoro-1,2-dihydro-3,6-pyridazinedione

A solution of difluoromaleic anhydride (1 g., 0.007 mole) and dimethylhydrazine dihydrochloride (0.93 g., 0.007 mole) in 10 ml. of glacial acetic acid is refluxed 3 hours. The solvent is removed under reduced pressure yielding crude 1,2-dimethyl-4,5-difluoro-1,2-dihydro-3,6-pyridazinedione. After recrystallization from n-butyl chloride, 300 mg. of product melting at 129.5–131° C. is obtained.

EXAMPLE 11

1,2-dicyclohexyl-4,5-dichloro-1,2-dihydro-3,6-pyridazinedione

Step A: Preparation of N-cyclohexyl-N-cyclohexylamino-2,3-dichloromaleamic acid.—A solution of 1,2-dicyclohexylhydrazine (2.10 g., 0.0107 mole) in anhydrous ether (10 ml.) is added with stirring to a solution of 2,3-dichloromaleic anhydride (1.79 g., 0.0107 mole) in anhydrous ether (20 ml.). After 15 minutes the ether is removed under reduced pressure and 3.5 g. of N-cyclohexyl-N-cyclohexylamino-2,3-dichloromaleamic acid isolated as a viscous yellow oil.

Step B: Preparation of 1,2-dicyclohexyl-4,5-dichloro-1,2-dihydro-3,6-pyridazinedione.—The maleamic acid is cyclized by refluxing a solution of the N-cyclohexyl-N-cyclohexylamino-2,3-dichloromaleamic acid from Step A in glacial acetic acid (25 ml.) for 8 hours to give a 40% yield of the pyridazinedione. Recrystallization from ethanol gives 1,2-dicyclohexyl-4,5-dichloro-1,2 - dihydro - 3,6-pyridazinedione melting at 158.5–161° C.

EXAMPLE 12

1,2-dimethyl-4,5-diiodo-1,2-dihydro-3,6-pyridazinedione

A solution of 1,2-dimethyl-4,5-dibromo-1,2-dihydro-3,6-pyridazinedione (0.6 g., 0.002 mole) from Example 3, and sodium iodide (6 g., 0.04 mole) in 10 ml. of N,N-dimethylformamide is heated at 130–135° C. for 1 hour. The solvent is removed and the resulting solid washed with water. After recrystallization from 2-propanol, 300 mg. of 1,2-dimethyl-4,5-diiodo-1,2-dihydro - 3,6 - pyridazinedione melting at 209–210° C. is obtained.

EXAMPLE 13

1,2-dimethyl-4,5-dibromo-1,2-dihydro-3,6-pyridazinedione

A solution of 2 g. of 1,2-dimethyl-4,5-dichloro-1,2-dihydro-3,6-pyridazinedione in 25 ml. of 30–36% hydrobromic acid in acetic acid is refluxed 6 hours and is allowed to stand 15 hours at 25° C. The solution is concentrated under reduced pressure to yield a solid which after recrystallization from isopropyl alcohol yields 1.5 g. of 1,2-dimethyl-4,5-dibromo-1,2-dihydro-3,6 - pyridazinedione melting at 197–200° C. Additional recrystallization yields product which melts at 210° C.

EXAMPLE 14

1-benzyl-2-methyl-4,5-dichloro-1,2-dihydro-3,6-pyridazinedione

Step A: Preparation of 1-benzyl-4,5-dichloro-1,2-dihydro-3,6-pyridazinedione.—A mixture of dichloromaleic anhydride (3.34 g., 0.02 mole) and benzylhydrazine hydrochloride (3.17 g., 0.02 mole) in glacial acetic acid (50 ml.) is heated at reflux for six hours. The solvent is removed on a steam bath under reduced pressure to give 5.33 g. of pale tan solid, M.P. 193–195.5° C. Recrystallization from diethyl ketone gives 4.0 g. (74%) of 1-benzyl-4,5-dichloro-1,2-dihydro - 3,6 - pyridazinedione, M.P. 196–198° C.

Step B: Preparation of 1-benzyl-2-methyl-4,5-dichloro-1,2-dihydro-3,6-pyridazineidone.—A solution of 1-benzyl-4,5-dichloro-1,2-dihydro - 3,6 - pyridazinedione (1.5 g., 0.0055 mole) in dimethyl sulfate (4 ml.) is heated at 155–160° C. for 3½ hours. After the reaction mixture is cooled, it is stirred with saturated potassium carbonate (25 ml.) for ½ hour then filtered and the filtrate extracted with hot ethyl acetate. The ethyl acetate extract is dried, filtered, and concentrated under reduced pressure to give 0.78 g. of pale yellow solid, M.P. 103–105° C. Recrystallization from n-butyl chloride gives 1-benzyl-2-methyl-4,5-dichloro-1,2-dihydro - 3,6 - pyridazinedione melting at 104.5–106.5° C.

EXAMPLE 15

1 - methyl - 2 - [2 - (4 - morpholinyl)ethyl] - 4,5 - dichloro - 1,2 - dihydro - 3,6 - pyridazinedione and its hydrochloride Step A: Preparation of 1-methyl-2-[2-(4-morpholinyl)-ethyl] - 4,5 - dichloro - 1,2 - dihydro - 3,6 - pyridazinedione.—A solution of 83.7 g. (0.361 mole) of 1-methyl-2-[2-(4-morpholinyl)ethyl]hydrazine hydrochloride (from Intermediate Preparation 9, Step C) and 60.2 g. (0.361 mole) of dichloromaleic anhydride in 2000 ml. of glacial acetic acid is heated at reflux under nitrogen for 1½ hours. The dark solution is concentrated under reduced pressure at steam-bath temperature and the residual gum is taken up in 300 ml. of saturated potassium carbonate solution and 300 ml. of chloroform. This mixture is saturated with solid potassium carbonate and filtered. The chloroform layer is separated and the aqueous layer is re-extracted with 2×100 ml. of chloroform. The combined extracts are filtered through charcoal, dried, and concentrated under reduced pressure at room temperature. Crystallization of the residue from 100 ml. of n-butyl chloride yields 25.6 g. of 1-methyl-2-[2-(4-morpholinyl)ethyl] - 4,5 - dichloro - 1,2 - dihydro - 3,6 - pyridazinedione which has a melting point of 120–127° C. Recrystallization from n-butyl chloride yields 21.2 g. of light yellow product which melts at 126–128° C.

Step B: Preparation of 1-methyl-2-[2-(4-morpholinyl)-ethyl] - 4,5 - dichloro - 1,2 - dihydro - 3,6 - pyridazinedione hydrochloride.—Ethanolic hydrogen chloride (1.7 ml., 6 N) is added to a solution of 3.08 g. (0.01 mole) of pure base (product of Step A) in 100 ml. of hot isopropyl alcohol. Upon cooling, a crystalline solid separates which is collected and recrystallized from 100 ml. of anhydrous methyl alcohol. 1-methyl-2-[2-(4-morpholinyl)ethyl]-4,5-dichloro - 1,2 - dihydro - 3,6 - pyridazinedione hydrochloride 2.28 g. (66% yield) is obtained as slightly yellow crystals which melt with decomposition at 239–241° C.

By replacing the ethanolic hydrogen chloride with alcoholic solutions of other acids such as hydrobromic, sulfuric, oxalic, p-toluenesulfonic and oxalic acids, the corresponding salts of the pyridazinedione are prepared.

EXAMPLE 16

1 - phenyl - 2 - [2 - (4 - morpholinyl)ethyl] - 4,5 - dichloro - 1,2 - dihydro - 3,6 - pyridazinedione -hydrochloride To a solution of 1.67 g. (0.01 mole) of 2,3-dichloromaleic anhydride in 30 ml. of glacial acetic acid is added 2.94 g. (0.01 mole) of 1-phenyl-2-[2-(4-morpholinyl)ethyl]hydrazine dihydrochloride (from Intermediate Preparation 11). The mixture is heated at reflux under nitrogen for ¾ hour then concentrated under reduced pressure at steam-bath temperature to give a brown solid. Recrystallization of this solid from 30 ml. of isopropyl alcohol-10 ml. water mixture gives 2.35 g. (58% yield) of white, crystalline 1 - phenyl - 2 - [2 - (4 - morpholinyl)ethyl]-4,5 - dichloro - 1,2 - dihydro - 3,6 - pyridazinedione hydrochloride, M.P. 256.5–259° C. dec.

EXAMPLE 17

1-methyl-2-[2-(4-morpholinyl)ethyl]-4,5-dichloro-1,2-dihydro-3,6-pyridazinedione The 1 - methyl - 2 - [2 - (4 - morpholinyl)ethyl] - 1,2-diformylhydrazine (4.31 g., 0.02 mole) [from Intermediate Preparation 9, Step B] is added to a solution of 3.34 g. (0.02 mole) of 2,3-dichloromaleic anhydride and 4.2 ml. of concentrated hydrochloric acid in 46 ml. of acetic acid. The solution is heated under reflux in a nitrogen atmosphere for 1½ hours and then concentrated at reduced pressure and steam bath temperature. Ethyl acetate (100 ml.) and saturated sodium carbonate solution (50 ml.) are added to the residual gum and the mixture is saturated with solid sodium carbonate. The ethyl acetate phase is removed and the aqueous layer is extracted with 100 ml. of ethyl acetate. The extracts are combined and concentrated to give 3.7 g. of oily, partially solid residue. Crystallization from n-butyl chloride yields 0.6 g. of 1-methyl - 2 - [2 - (4 - morpholinyl)ethyl] - 4,5 - dichloro-1,2-dihydro-3,6-pyridazinedione with M.P. of 124–126° C. Recrystallization from the same solvent yields product melting at 126–128° C.

EXAMPLE 18

1,2-bis[2-(4-morpholinyl)ethyl]-4,5-dichloro-1,2-dihydro-3,6-pyridazinedione

A solution of 3.31 g. (0.01 mole) of the 1,2-bis[2-(4-morpholinyl)ethyl]hydrazine hydrochloride salt (from Intermediate Preparation 15, Sept B) and 1.67 g. (0.01 mole) of 2,3-dichloromaleic anhydride in 50 ml. of acetic acid is heated at reflux for 1¼ hours under nitrogen. The solution is concentrated under reduced pressure and the residue is taken up in 100 ml. of ethyl acetate and 50 ml. of saturated sodium carbonate solution. This mixture is saturated with solid sodium carbonate, the ethyl acetate layer is separated, dried with sodium sulfate and concentrated under reduced pressure to give 1.6 g. of oily yellow solid. Crystallization from ethyl alcohol gives 0.5 g. of yellow crystalline 1,2-bis[2-(4-morpholinyl)ethyl]-4,5-dichloro-1,2-dihydro-3,6-pyridazinedione which has a melting point of 188–190° C.

EXAMPLE 19

1-methyl-2-[2-(1,1-dioxo-4-thiomorpholinyl)ethyl]-4,5-dibromo-1,2-dihydro-3,6-pyridazinedione A mixture of 2.56 g. (0.01 mole) of dibromomaleic anhydride, 2.8 g. (0.01 mole) of 1-methyl-2-[2-(1,1-dioxo-4-thiomorpholinyl)ethyl]hydrazine hydrochloride (from Intermediate Preparation 36) and 1.6 g. (0.0205 mole) of sodium acetate in 50 ml. of acetic acid is heated under reflux in a nitrogen atmosphere for 45 minutes. The mixture is cooled, filtered and concentrated in vacuo to a gummy residue. Ethyl acetate (300 ml.) and saturated aqueous sodium carbonate solution (40 ml.) are added and after thorough mixing the ethyl acetate phase is separated. The ethyl acetate solution is dried and evaporated to give 1.8 g. of crystalline residue. Recrystallization from ethyl alcohol yields 1-methyl-2-[2-(1,1-dioxo-4-thiomorpholinyl)ethyl] - 4,5 - dibromo - 1,2 - dihydro - 3,6 - pyridazinedione having a melting point of 184–185° C.

EXAMPLE 20

1-methyl-2-[2-(4-morpholinyl)ethyl]-4,5-dibromo-1,2-dihydro-3,6-pyridazinedione

By replacing the 1-methyl-2-[2-(1,1-dioxo-4-thiomorpholinyl)ethyl]hydrazine hydrochloride of Example 19 with an equimolar amount (2.3 g.) of 1-methyl-2-[2-(4-morpholinyl)ethyl]hydrazine hydrochloride and proceeding exactly as described therein, there is obtained 1-methyl-2 - [2-(4-morpholinyl)ethyl]-4,5-dibromo-1,2-dihydro-3,6-pyridazinedione. Recrystalization from n-butyl chloride yields 1.1 g. of material which has a melting point of 164.5–166° C.

The hydrazine used in Examples 20 and 21 is from Intermediate Preparation 9, Step C.

EXAMPLE 21

1-methyl-2-[2-(4-morpholinyl)ethyl]-4,5-difluoro-1,2-dihydro-3,6-pyridazinedione and its hydrochloride Step A: Preparation of 1-methyl-2-[2-(4-morpholinyl)-ethyl] - 4,5 - difluoro-1,2-dihydro-3,6-pyridazinedione.— Sodium acetate (1.6 g., 0.0205 mole) is added to a solution of 2.3 g. (0.01 mole) of 1-methyl-2-[2-(4-morpholinyl)ethyl]hydrazine hydrochloride in 50 ml. of acetic acid with stirring in a nitrogen atmosphere. Difluoromaleic anhydride (0.01 mole) is added and the mixture is heated under reflux for 1.5 hours then cooled, filtered and concentrated to a gummy residue. Ethyl acetate (200 ml.) and saturated sodium carbonate solution (25 ml.) are added and after thorough mixing the ethyl acetate phase is separated, dried and evaporated. The crystalline residue is recrystallized from n-butyl chloride to yield 1.8 g. of 1-methyl - 2[2-(4-morpholinyl)-ethyl]-4,5-difluoro-1,2-dihydro-3,6-pyridazinedione. Additional recrystallization from n-butyl chloride yields product having a melting point of 138–140° C.

Step B: Preparation of 1-methyl-2-[2-(4-morpholinyl)-ethyl]-4,5-difluoro-1,2-dihydro-3,6-pyridazinedione hydrochloride.—Treatment of an isopropyl alcohol solution of the product from Step A with ethanolic hydrogen chloride by the procedure of Example 15, Step B, yields a crystalline hydrochloride salt. Recrystallization from ethyl alcohol gives pure 1-methyl-2-[2-(4-morpholinyl)ethyl]-4,5 - difluoro-1,2-dihydro-3,6-pyridazinedione hydrochloride which has a melting point of 223.5–224.5° C.

EXAMPLE 22

1 - methyl-2-(3 - dimethylamino-2-methylpropyl) - 4,5-difluoro-1,2-dihydro-3,6-pyridazinedione and its oxlate salt Step A: Preparation of 1-methyl-2-(3-dimethylamino-2-methylpropyl) - 4,5 - difluoro-1,2-dihydro-3,6-pyridazinedione.—By replacing the 1-methyl-2-[2-(4-morpholinyl)-ethyl]hydrazine hydrochloride of Example 21, Step A, with an equivalent quantity of 1-methyl-2-(3-dimethylamino-2-methylpropyl)hydrazine hydrochloride and proceeding as described in Example 21, Step A, there is obtained 0.75 g. 1-methyl-2-(3-dimethylamino-2-methylpropyl)-4,5-difluoro-1,2-dihydro-3,6-pyridazinedione. Recrystallization from hexane yields crystalline material which melts at 62–64° C.

The hydrazine used in Step A is from Intermediate Preparation 30 (Table V).

Step B: Preparation of 1-methyl-2-[2-(4-morpholinyl)-methylpropyl) - 4,5-difluoro-1,2-dihydro-3,6-pyridazinedione oxalate.—Addition of oxalic acid to an isopropyl alcohol solution of the base obtained as the product of Step A yields an oxalate salt. Recrystallization from isopropyl alcohol gives 1 - methyl-2-(3-dimethylamino-2-2 - methylpropyl)4-,5-difluoro-1,2-dihydro-3,6-pyridazinedione oxalate which melts with decomposition at 65–80° C.

EXAMPLE 23

1-methyl-2-[2-(1,1-dioxo-4-thiomorpholinyl)-ethyl]-4,5-difluoro-1,2-dihydro-3,6-pyridazinedione Sodium acetate (1.2 g., 0.015 mole) is added to a solution of 2.0 g. (0.007 mole) of 1-methyl-2-[2-(1,1-dioxo-4-thiomorpholinyl)ethyl]hydrazine hydrochloride (from Intermediate Preparation 36) in 35 ml. of acetic acid. After 5 minutes of stirring, 0.0007 mole of difluoromaleic anhydride is added and the solution is heated under reflux in a nitrogen atmosphere for 1¼ hours. The solution is cooled, filtered and concentrated in vacuo to a viscous oil. Ethyl acetate (200 ml.) and saturated aqueous sodium carbonate solution (50 ml.) are added and after thorough mixing the ethyl acetate phase is separated. The ethyl acetate solution is dried over anhydrous potassium carbonate and then evaporated to give a crystalline residue. Recrystallization from ethyl alcohol yields 0.9 g. of 1-methyl - 2-[2 - (1,1-dioxo-4-thiomorpholinyl)ethyl]-4,5-difluoro-1,2-dihydro-3,6-pyridazinedione having a melting point of 164–165° C.

EXAMPLE 24

1-methyl-2-(3-dimethylamino-2-methylpropyl)-4,5-dichloro-1,2-dihydro-3,6-pyridazinedione methiodide A solution of 1-methyl-2-(3-dimethylamino-2-methylpropy - 4,5 - dichloro - 1,2 - dihydro-3,6-pyridazinedione (from Example 45) (0.50 g., 0.0017 mole) in 3 ml. of methyl iodide is heated under reflux for 15 minutes. Ether (50 ml.) is added to the cooled reaction mixture and the pale yellow solid which crystallizes is collected and washed with ether. The product, 1-methyl-2-(3-dimethylamino-2-methylpropyl) - 4,5 - dichloro-1,2-dihydro-3,6-pyridazinedione methodide is obtained in 73% yield (0.54 g.) with melting point of 263.5–264.5° C.

Other 1-R-2-R¹-4,5-dichloro-1,2-dihydro-3,6-pyridazinedione compounds prepared by methods described in the detailed examples are identified and tabulated in the following Tables I, II and III.

In each example, dichloromaleic anhydride is caused to react with a hydrazine of the structure

to yield the pyridazinedione compound of the structure

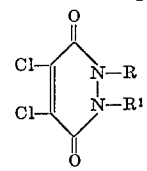

The variable groups R and R¹ of the hydrazine remain unchanged by the reaction and are identified in the appropriate columns in the tables. All conditions of equivalency applying to intermediate hydrazine free bases and salts and physical forms thereof as outlined for the detailed examples apply also to the tabulated examples.

In Table I are tabulated additional 4,5-dihalo-1,2-dihalo-1,2-dihydro-3,6-pyridazinediones prepared by the methods disclosed in the various detailed examples. Reference is made to the various intermediate preparation sections for all new hydrazine intermediates.

Table II identifies 1-R-2-R¹-4,5-dichloro-1,2-dihydro-3,6-pyridazinediones in which R¹ represents a basic substituent. All reactions of the hydrazine intermediates with dichloromaleic anhydride to yield the pyridazinedione base are carried out by the procedure of Example 15, Step A, with the only variation being in the length of the reaction period. Reaction times and sources of hydrazine intermediates are indicated in the table. The pyridazinedione products are isolated as a free base by the method of Example 15, Step A, or as an acid addition salt by the method of Example 15, Step B, or in both forms. Where pertinent, the salts obtained and their physical constants are indicated under remarks.

Table III identifies other 1-R-2-$R^1$-4,5-dichloro-1,2-dihydro-3,6-pyridazinediones prepared by reacting known hydrazines with dichloromaleic acid anhydride by substantially the same procedure described in Example 15, Step A.

TABLE I

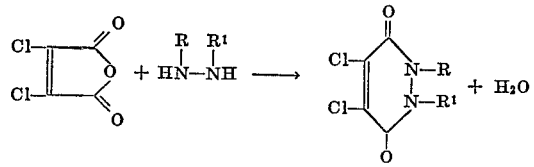

| Ex. No. | R | $R^1$ | Method used Ex. No. | Yield, percent | Purification-recrystallization solvent | M.P., °C. | Remarks |
|---|---|---|---|---|---|---|---|
| 25 | $CH_3$ | $CH_3-(CH_2)_6-$ | 1 | 63 | | | B.P., 202-9° C. at 0.2 mm. pressure. Hydrazine from Intermediate Prepn. 2. |
| 26 | $CH_3$ | $HOOC-CH_2-$ | 3 / 1 | 11 / 47 | Water | 206-207 dec. | Dichloromaleic anhydride was used in both preparations. Hydrazine from Intermediate Prepn. 3. |
| 27 | $CH_3$ | $C_6H_{11}$* | 2 | 17 | Ethanol | 103.5-105.5 | Hydrazine prepared as described in Intermediate Prepn. 2. |
| 28 | $CH_3$ | $C_6H_5-$ | 2 | 88 | n-Butyl chloride | 145-147.5 | |
| 29 | $CH_3$ | $p-Cl-C_6H_4-CH_2-$ | 2 | 57 | do | 148-150 | Hydrazine from Intermediate Prepn. 1. |
| 30 | $CH_3$ | $p-HOOC-C_6H_4-CH_2-$ | 3 | 38 | Ethanol-water | 245-247 | Dichloromaleic anhydride was used in the preparation. Hydrazine from Intermediate Prepn. 5. |
| 31 | $CH_3$ | $C_6H_5-CH_2CH_2-$ | 1 | 38 | n-Butyl chloride | 110-111.5 | |
| 32 | $(CH_3)_2CH-$ | $(CH_3)_2CH-$ | 1 | 7 | 2-propanol | 200-205 | |
| 33 | $(CH_3)_2CH-$ | $C_6H_5-$ | 1 | 72 | Ethanol | 166-168 | |
| 34 | $(CH_3)_2CH-$ | $m-CH_3O-C_6H_4-$ | 2 | 20 | Ethanol, then n-butyl chloride. | 153.5-157 | Hydrazine from Intermediate Prepn. 6. |
| 35 | $(CH_3)_2CH-$ | $p-HOOC-C_6H_4-$ | 2 | 61 | Abs. ethanol | 246.5-248.5 | Hydrazine from Intermediate Prepn. 7. |
| 36 | $CH_3(CH_2)_6-$ | $CH_3(CH_2)_6-$ | 2 | 63 | Hexane (with Dry Ice-acetone cooling). | 36.5-37.5 | |
| 37 | $C_6H_{11}$* | $C_6H_5-$ | 2 | 68 | Cyclohexane | 134.5-136 | |
| 38 | $(C_2H_5)_2CH-$ | $(C_2H_5)_2CH-$ | 2 | 49 | | | B.P., 155-160° C. at 0.4 mm. pressure $n_D^{25}$ 1.5315. |

*Cyclohexyl group.

TABLE II

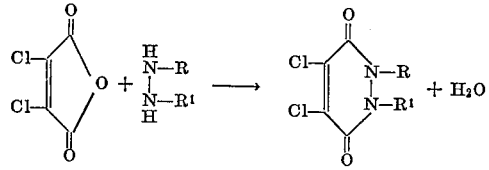

| Ex. No. | R | $R^1$ | Hydrazine Intermediate Prep. No. | Reaction time | Crystallization solvent | Melting point, °C. | Remarks |
|---|---|---|---|---|---|---|---|
| 39 | $CH_3$ | $-CH_2CH_2N(CH_3)_2$ | 27 | 2 hr | Isopropyl ether | 81-83 | |
| 40 | $CH_3$ | $-CH_2CH_2N(C_2H_5)_2$ | 4 | 3 hr | Cyclohexane | 84.5-86.5 | |
| 41 | $CH_3$ | $-CH_2CH_2N[CH(CH_3)_2]_2$ | 28 | 2 hr | do | 109.5-110.5 | |
| 42 | $CH_3$ | $-CH_2CH_2N(C_4H_9)_2$ | 29 | 3½ hr | do | 78.80 | |
| 43 | $CH_3$ | $-(CH_2)_3N(CH_3)_2$ | 32 | 3¾ hr | | | Oxalate salt; M.P. (dec.), 154-156° C. Crystallization solvent—ethyl alcohol. |
| 44 | $CH_3$ | $-(CH_2)_3N(C_2H_5)_2$ | 33 | 3 hr | | | Free base purified by short-path distillation; B.P., 208-216° C. at 0.3 mm. |
| 45 | $CH_3$ | $-CH_2\overset{CH_3}{\underset{}{C}H}CH_2N(CH_3)_2$ | 30 | 2 hr | Cyclohexane | 72.5-74.5 | Hydrochloride salt; M.P., 219-220.5° C. Crystallization solvent—ethyl alcohol-water mixture. |
| 46 | $CH_3$ | $-CH_2\overset{CH_3}{\underset{CH_3}{C}}CH_2N(CH_3)_2$ | 13 | 30 min | Hexane | 74.5-76.5 | |
| 47 | $CH_3$ | $-\overset{CH_3}{\underset{}{C}H}CH_2N(C_2H_5)_2$ | 12 | 20 min | | | Hydrochloride salt; M.P., 189-191° C. Crystallization solvent—ethyl alcohol-ether mixture. |
| 48 | $CH_3$ | $-CH_2\overset{CH_3}{\underset{}{C}H}N(C_2H_5)_2$ | 31 | 1 hr | Cyclohexane | 91.5-93.5 | |
| 49 | $CH_3$ | $-\overset{CH_3}{\underset{}{C}H}(CH_2)_3N(CH_3)_2$ | 14 | 15 min | | | p-Toluenesulfonate salt; M.P., 122-123.5° C. Crystallization solvent—diethyl ketone. |
| 50 | $CH_3$ | $-CH_2CH_2N\bigcirc$ | 34 | 1¾ hr | Cyclohexane | 111-113 | |

TABLE II—Continued

| Ex. No. | R | R¹ | Hydrazine Intermediate Prep. No. | Reaction time | Pyridazinedione Products | | Remarks |
|---|---|---|---|---|---|---|---|
| | | | | | Crystallization solvent | Melting point, °C | |
| 51 | $CH_3$ | $-CH_2CH_2N\langle S \rangle$ | 35 | 1 hr | n-Butyl chloride | 119–121.5 | |
| 52 | $CH_3$ | $-CH_2CH_2N\langle SO_2 \rangle$ | 36 | 45 min | Water | 173.5–175 | |
| 53 | $CH_3$ | $-CH_2CH_2N\langle N-CH_3 \rangle$ | 42 | 1 hr | Cyclohexane | 102.5–104.5 | |
| 54 | $CH_3$ | $-(CH_2)_3N\langle N-CH_3 \rangle$ | 37 | 3 hr | n-Butyl chloride | 121–123 | |
| 55 | $CH_3$ | $-(CH_2)_3N\langle O \rangle$ | 43 | 1½ hr | | | Hydrochloride salt; M.P., 226–227.5° C. Crystallization solvent—ethyl alcohol. |
| 56 | $CH_3$ | $-CH_2CH_2N(CH_3)-\text{Ph}$ | 39 | 1½ hr | Ethyl alcohol | 171–172.5 | |
| 57 | $CH_3$ | $-(CH_2)_2N(CH_3)-CH_2\text{Ph}$ | 10 | 5 min | Isopropyl ether | 70.5–72 | |
| 58 | $CH_3$ | $-(CH_3)_2N(CH_3)-CH_2\text{Ph}$ | 41 | 2 hr | | | Oxalate salt (dec.); M.P., 163–165° C. Crystallization solvent—isopropyl alcohol. |
| 59 | $CH_3$ | N-methylpiperidinyl | 16 | 15 min | Cyclohexane | 142.5–144 | |
| 60 | $CH_3$ | (N-methylpiperidinyl)-$CH_2-$ | 38 | 4½ hr | Isopropyl ether | 80–83 | |
| 61 | $CH_3$ | $(CH_3)_2N-\text{cyclohexyl}$ | 19 | 15 min | Hexane | 148.5–151 | |
| 62 | Ph | $-CH_2CH_2N(C_2H_5)_2$ | 23 | 3 hr | Hexane | 77.5–80 | |
| 63 | Ph | $-CH_2CH_2N\langle O \rangle$ | 11 | 45 min | Isopropyl ether | 142–144 | See Ex. 16 for hydrochloride salt. |
| 64 | Ph-Cl | $-CH_2CH_2N\langle O \rangle$ | 25 | 15 min | do | 148–150 | Hydrochloride salt; M.P., 224–226° C. Crystallization solvent—isopropyl alcohol. |
| 65 | F-Ph | $-CH_2CH_2N\langle O \rangle$ | 24 | 30 min | Methylcyclohexane. | 133–135 | |
| 66 | Ph-$CH_3O$ | $-CH_2CH_2N\langle O \rangle$ | 26 | 3 min | Isopropyl ether methylcyclohexane mixture. | 144.5–146 | Hydrochloride salt; M.P., 212.5–214° C. Crystallization solvent—isopropyl alcohol. |
| 67 | $CH_3$ | pyridyl | 17 | 3 hr | | | Not crystallized. |
| 68 | $CH_3$ | $(CH_3)_2NCH_2-\text{cyclohexyl}$ | 18 | 1 hr | | | Do. |

TABLE II—Continued

| Ex. No. | R | R¹ | Hydrazine Intermediate Prep. No. | Reaction time | Crystallization solvent | Melting point, °C | Remarks |
|---|---|---|---|---|---|---|---|
| 69 | $CH_3$ | —CHCH$_2$N(C$_2$H$_5$)$_2$ (phenyl) | 20 | 20 min | | | Do. |
| 70 | $CH_3$ | —CH$_2$CHN(C$_2$H$_5$)$_2$ (phenyl) | 21 | 15 min | | | Do. |
| 71 | $(CH_3)_2CH-$ | —(phenyl)—CH$_2$N(CH$_3$)$_2$ | 22 | 30 min | Hexane | 108–109.5 | |

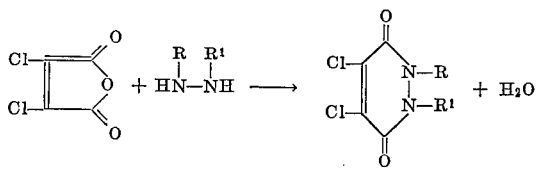

$$Cl\text{-maleic anhydride} + HN(R)(R^1)\text{-NH} \longrightarrow \text{Cl-pyridazinedione}(N\text{-}R, N\text{-}R^1) + H_2O$$

TABLE III

| Ex. No. | R | R¹ |
|---|---|---|
| 72 | butyl | butyl. |
| 73 | hexyl | hexyl. |
| 74 | 1-methylheptyl | 1-methylheptyl. |
| 75 | octadecyl | octadecyl. |
| 76 | 1-t.butylvinyl | phenyl. |
| 77 | 1-ethylpropenyl | phenyl. |
| 78 | isopropenyl | phenyl. |
| 79 | 1-methyl-1-butenyl | phenyl. |
| 80 | 1-methyl-1-heptenyl | phenyl. |
| 81 | 1-methylpropenyl | p-methoxyphenyl. |
| 82 | 2,4-hexadienyl | 2,4-hexadienyl. |
| 83 | 2-cyclohexyl-1-methylethyl | 2-cyclohexyl-1-methylethyl. |
| 84 | 2-(2,2,3-trimethyl-3-cyclopenten-1-yl)ethyl | 2-(2,2,3-trimethyl-3-cyclopenten-1-yl)ethyl. |
| 85 | cyclobutyl | cyclobutyl. |
| 86 | cyclopentyl | phenyl. |
| 87 | cyclohexyl | 1-methylethyl. |
| 88 | 1-cyclopenten-1-yl | phenyl. |
| 89 | 1-cyclopentadienyl | phenyl. |
| 90 | 1-cyclohexen-1-yl | phenyl. |
| 91 | 3-chloro-2-butenyl | methyl. |
| 92 | trifluoromethyl | trifluoromethyl. |
| 93 | 2-chloroethyl | 2-chloroethyl. |
| 94 | pentafluoroethyl | pentafluoroethyl. |
| 95 | 3,3-dichloro-2-methylallyl | 3,3-dichloro-2-methylallyl. |
| 96 | benzyl | phenyl. |
| 97 | benzyl | 1-methyl-3-phenylpropyl. |
| 98 | benzyl | isopropyl. |
| 99 | benzyl | 2-butyl. |
| 100 | benzyl | 1-methyl-2-phenylethyl. |
| 101 | benzyl | 1-methyl-3-phenylpropyl. |
| 102 | 2-phenylethyl | isopropyl. |
| 103 | 2-phenylethyl | 2-butyl. |
| 104 | 2-phenylethyl | 1-methyl-2-phenylethyl. |
| 105 | 2-phenylethyl | 1-methyl-3-phenylpropyl. |
| 106 | p-(isopropylaminocarbonylmethoxy)benzyl | methyl. |
| 107 | p-(isopropylaminomethyl)benzyl | methyl. |
| 108 | p-fluorobenzyl | isopropyl. |
| 109 | p-methoxybenzyl | isopropyl. |
| 110 | α-methylphenethyl | phenethyl. |
| 111 | p-phenylbenzyl | methyl. |
| 112 | p-chlorobenzyl | benzyl. |
| 113 | o-methoxy-α-methylphenethyl | o-methoxy-α-methylphenethyl. |
| 114 | α,α-dimethylbenzyl | 2,4-dinitrophenyl. |
| 115 | 2-iodo-5-nitro-α-nitromethylbenzyl | 2,4-dinitrophenyl. |
| 116 | p-methylsulfonylbenzyl | methyl. |
| 117 | o-(α-dimethylamino-o-tolyl)benzyl | o-(α-dimethylamino-o-tolyl)-α-phenylbenzyl. |
| 118 | p,α-dimethylbenzyl | isopropyl. |
| 119 | β-(p-tolyl)vinyl | phenyl. |
| 120 | 3,5-dibromo-2-hydroxybenzyl | 3,5-dibromo-2-hydroxybenzyl. |
| 121 | 2-phenylsulfonylvinyl | phenyl. |
| 122 | phenylsulfonylmethyl | phenylsulfonylmethyl. |
| 123 | 2-(p-tolylsulfonyl)ethyl | phenyl. |
| 124 | p-(dimethylamino)benzyl | methyl. |
| 125 | 2-hydroxyethyl | 1-hydroxyethyl. |
| 126 | 1-carboxyisopropyl | 1-carboxyisopropyl. |
| 127 | 1-cyanoisopropyl | 1-cyanoisopropyl. |
| 128 | 1-thiocyanoisopropyl | 1-thiocyanoisopropyl. |
| 129 | 1-thiocyanocyclohexyl | 1-thiocyanocyclohexyl. |
| 130 | 1-(2-oxocyclopentyl)isopropyl | 1-(2-oxocyclopentyl)isopropyl. |
| 131 | 2,2-dinitropropyl | 2,2-dinitropropyl. |
| 132 | 2-nitrocyclohexyl | phenyl. |
| 133 | 2-methylcyclohexyl | 2-methylcyclohexyl. |
| 134 | 1-phenylcyclohexyl | phenyl. |
| 135 | 2-(diethylamino)ethyl | 2-(diethylamino)ethyl. |
| 136 | 2-dipropylaminoethyl | 2-(dimethylamino)ethyl. |
| 137 | 2-(diisopropylamino)ethyl | 2-(diisopropylamino)ethyl. |
| 138 | 3-(dimethylamino)-1-methylpropyl | phenyl. |
| 139 | 3-(N-methyl-N-ethylamino)propyl | 2-(dipropylamino)ethyl. |
| 140 | 2-(N-benzyl-N-methylamino)ethyl | 2-(dimethylamino)ethyl. |
| 141 | 2-(dimethylamino)ethyl | 3-(dimethylamino)propyl. |
| 142 | 2-(dimethylamino)ethyl | 1-methyl-3-piperidinyl. |
| 143 | 2-(diethylamino)ethyl | 2-(dimethylamino)ethyl. |
| 144 | 2-(dimethylamino)ethyl | 2-(dimethylamino)ethyl. |
| 145 | 1-methyl-2-(dimethylamino)ethyl | isopropyl. |
| 146 | 1-methyl-3-(dimethylamino)propyl | isopropyl. |
| 147 | 1-methyl-3-(dimethylamino)propyl | phenyl. |
| 148 | 2-(N-cyclohexyl-N-methylamino)ethyl | 2-(diethylamino)ethyl. |
| 149 | 5-(dicyclohexylamino)pentyl | 4-(dipropargylamino)butyl. |
| 150 | 3-dialkylaminopropyl | 4-(dimethylamino)butyl. |
| 151 | 2-(dibenzylamino)ethyl | 2-(diphenylamino)ethyl. |
| 152 | 2-[N-(o-methylbenzyl)-N-methylamino]ethyl | 2-(dimethylamino)ethyl. |
| 153 | 2-[N-(p-methoxybenzyl)-N-methylamino]ethyl | 2-(dimethylamino)ethyl. |
| 154 | 2-(4-morpholinyl)ethyl | 2-piperidinylethyl. |
| 155 | 2-(4-morpholinyl)ethyl | 2-(dimethylamino)ethyl. |
| 156 | 2-(1-piperidinyl)ethyl | 2-piperidinylethyl. |
| 157 | 2-(1-piperidinyl)ethyl | 2-(dimethylamino)ethyl. |
| 158 | 2-(1-piperidinyl)ethyl | 2-(dibutylamino)propyl. |
| 159 | 2-(1-piperidinyl)ethyl | 4-(N-o-chlorobenzyl-N-methyl)amino)butyl. |
| 160 | 2-(3-hydroxy-1-piperidinyl)ethyl | 2-(4-morpholinyl)ethyl. |
| 161 | 2-(3-hydroxy-1-piperidinyl)ethyl | 2-(dimethylamino)ethyl. |
| 162 | 2-(3-hydroxy-1-piperidinyl)ethyl | 2-(1-methyl-4-piperazinyl)ethyl. |
| 162a | 6-(3-hydroxypiperidinyl)hexyl | 2-indolinylethyl. |
| 163 | 2-(4-methyl-1-piperazinyl)ethyl | 1-methyl-3-piperidinyl. |
| 164 | 2-(4-methyl-1-piperazinyl)ethyl | 2-(diethylamino)ethyl. |
| 165 | 2-(4-methyl-1-piperazinyl)ethyl | 2-(dimethylamino)ethyl. |
| 166 | 2-(4-methyl-1-piperazinyl)ethyl | 1-methyl-3-piperidinyl. |
| 167 | 2-(1-pyrrolidinyl)ethyl | 2-(dimethylamino)ethyl. |
| 168 | 2-(1-pyrrolidinyl)ethyl | 2-(1-piperidinyl)ethyl. |
| 169 | 2-(1-pyrrolidinyl)ethyl | 2-(diethylamino)ethyl. |
| 170 | 2-(2,5-dimethyl-1-pyrrolidinyl)ethyl | 2-(diethylamino)ethyl. |
| 171 | 2-(2,5-dimethyl-1-pyrrolidinyl)ethyl | 2-(dimethylamino)ethyl. |
| 172 | 2-(1-pyrrolidinyl)ethyl | 1-methyl-3-piperidinyl. |
| 173 | 2-pyridylmethyl | methyl. |
| 174 | 3-pyridylmethyl | methyl. |
| 175 | 4-pyridylmethyl | methyl. |
| 176 | 5-methyl-3-isoxazolylmethyl | methyl. |
| 177 | 3,5-dimethyl-4-isoxazolylmethyl | methyl. |
| 178 | 3-indolylmethyl | methyl. |
| 179 | 2-isoindolinylethyl | 3-(N-methyl-N-allylamino)propyl. |
| 180 | 2-thienylmethyl | 3-(N-methyl-N-allylamino)propyl. |
| 181 | 5-(isopropylaminocarbonyl)-2-thienylmethyl | 3-(N-methyl-N-allylamino)propyl. |
| 182 | α-furfuryl | 3-(N-methyl-N-allylamino)propyl. |
| 183 | 5-(isopropylaminocarbonyl)-2-furylmethyl | 3-(N-methyl-N-allylamino)propyl. |

TABLE III—Continued

| Ex. No. | R | R¹ |
|---|---|---|
| 184 | 4-dibenzofuranylmethyl | 3-(N-methyl-N-allylamino)propyl. |
| 185 | 2-(1,2,3,4-tetrahydroisoquinolinyl)ethyl. | 2-(dimethylamino)ethyl. |
| 186 | 2-(1,2,3,4-tetrahydroisoquinolinyl)ethyl. | 2-(1-methyl-4-piperazinyl)ethyl. |
| 187 | 1,2,3,4-tetrahydroquinolinylethyl. | 2-(4-morpholinyl)ethyl. |
| 188 | 1,4-benzodioxan-2-ylmethyl | benzyl. |
| 189 | 1,4-benzodioxan-2-ylmethyl | sec. butyl. |
| 190 | 1,4-benzodioxan-2-ylmethyl | isopropyl. |
| 191 | (β-1,4-benzodioxan-2-ylmethyl)phenylpropyl. | (β-1,4-benzodioxan-2-yl-methyl)phenylpropyl. |
| 192 | 2-[N-(2′-benzodioxyl)-N-ethylamino]ethyl. | 2-dimethylaminoethyl. |
| 193 | phenyl | ethyl. |
| 194 | p-chlorophenyl | methyl. |
| 195 | m-chlorophenyl | methyl. |
| 196 | p-bromophenyl | p-chlorobenzyl. |
| 197 | o-trifluoromethylphenyl | o-trifluoromethylphenyl. |
| 198 | 3-chloro-o-tolyl | 3-chloro-o-tolyl. |
| 199 | p-tolyl | methyl. |
| 200 | p-tolyl | ethyl. |
| 201 | p-nitrophenyl | methyl. |
| 202 | p-nitrophenyl | ethyl. |
| 203 | p-methoxyphenyl | methyl. |
| 204 | methoxyphenyl | methoxyphenyl. |
| 205 | 4-nitro-2,5-xylyl | 4-nitro-2,5-xylyl. |
| 206 | 2′,3-dimethyl-4-biphenylyl | 2′,3-dimethyl-4-biphenylyl |
| 207 | p-styrylphenyl | p-styrylphenyl. |
| 208 | 1-naphthyl | phenyl. |
| 209 | 2-furyl | benzyl. |
| 210 | 2-thienyl | benzyl. |
| 211 | 2-thienyl | methyl. |
| 212 | 2-thiazolyl | 2-thiazolyl. |
| 213 | 5-chloro-1,3,4-thiadiazol-2-yl | 5-chloro-1,3,4-thiadiazol-2-yl. |
| 214 | 1-isopropyl-3-pyrrolidinyl | methyl. |
| 215 | 2-pyrrolinyl | methyl. |
| 216 | 4-(p-bromophenyl)imidazol-2-yl | phenyl. |
| 217 | 5-(p-bromophenyl)imidazol-2-yl | phenyl. |
| 218 | 2-imidazolyl | methyl. |
| 219 | 2-dimethylamino-4-piperidinyl | 1-dimethylamino-4-piperidinyl |
| 220 | 1-methyl-4-piperidinyl | 1-methyl-4-piperidinyl. |
| 221 | 2-pyridyl | methyl. |
| 222 | 2,6-dimethyl-3-pyridyl | 2,6-dimethyl-3-pyridyl |
| 223 | 3-pyridazinyl | methyl. |
| 224 | 4,6-diethyl-2-pyrimidinyl | 4,6-diethyl-2-pyrimidinyl. |
| 225 | 4-ethyl-6-methyl-2-pyrimidinyl | 4-ethyl-6-methyl-2-pyrimidinyl. |
| 226 | 4-dimethylamino-5-nitro-2-pyrimidinyl. | methyl. |
| 227 | 2-triazinyl | methyl. |
| 228 | 3-phthalazinyl | methyl. |
| 229 | 4-quinazolinyl | methyl. |
| 230 | 1-methyl-4-piperidinyl | methyl. |

EXAMPLE 231

1-methyl-2-methoxycarbonylmethyl-4,5-dichloro-1, 2-dihydro-3,6-pyridazinedione

A solution of 1-methyl-2-carboxymethyl-4,5-dichloro-1,2-dihydro-3,6-pyridazinedione from Example 26 (1.01 g., 0.004 mole) in anhydrous methanol (3 ml.) and ethylene dichloride (5 ml.) containing two drops of concentrated sulfuric acid is heated at reflux for 16 hours under nitrogen. The solution then is concentrated under reduced pressure at room temperature and the residual liquid taken up in ethyl acetate. The ethyl acetate solution is washed with saturated sodium bicarbonate solution and water, dried and concentrated under reduced pressure to give 0.75 g. (70% yield) of 1-methyl-2-methoxycarbonylmethyl-4,5-dichloro - 1,2 - dihydro-3,6-pyridazinedione in the form of a pale yellow oil which solidifies, melting point 113–116° C. Recrystallization from n-butyl chloride raises the melting point to 115–117° C.

EXAMPLE 232

1-isopropyl-2-(4-β - diethylaminoethoxycarbonylphenyl)-4,5 - dichloro - 1,2 - dihydro - 3,6 - pyridazinedione hydrochloride monohydrate To a suspension of 1-isopropyl-2-(4-carboxyphenyl)-4,5-dichloro-1,2-dihydro-3,6-pyridazinedione from Example 35 (3.43 g., 0.01 mole) in anhydrous 2-propanol (50 ml.) is added β-diethylaminoethyl chloride (1.50 g., 0.011 mole). The mixture is heated at reflux under nitrogen for 20 hours and the clear yellow solution obtained is cooled in an ice bath whereupon a yellow solid separates. The solid is filtered and recrystallized from 2-propanol to give 4.12 g. (83% yield) of 1-isopropyl-2-(4-β-diethylaminoethoxycarbonylphenyl) - 4,5 - dichloro-1,2 - dihydro-3,6-pyridazinedione hydrochloride monohydrate, melting point 187.5–189° C.

The following intermediate preparation section illustrates methods used for preparing hydrazine intermediates for use in the synthesis of the novel dihalodihydropyridazinedione compounds of this invention. It is to be understood, of course, that the reactions of the intermediate preparations are not to be considered limitative as the compounds could be prepared by other methods. Where details for the preparation of the starting material are not given, they are either readily available commercially or their preparation is described in the literature. The details of preparation of all new hydrazines are provided in the following section.

It is obvious that the 1,2-disubstituted hydrazines whether including or excluding additional basic substituents are themselves organic bases and as such form salts with organic and inorganic acids. For the purposes of subsequent use of the hydrazine in the preparation of the pyridazinedione compounds of the invention described herein, hydrazines isolated as crystalline free bases, non-distilled liquid free bases, distilled liquid free bases, non-crystallized acid salts and crystalline acid salts are equivalent. Hydrazines formed as salts in a reaction process can be isolated as such in non-crystallized or crystalline form or as free bases by alkalinization at any appropriate stage of the reaction workup process. They can be converted to the corresponding hydrazine free bases which, after workup suitable to the free base, are isolated as the crystalline free base, non-distilled liquid free base or distilled liquid free base. Conversely, hydrazines formed as the free base in a reaction process can be isolated as such in non-distilled liquid, distilled liquid or crystalline form or, by acidification with an organic or inorganic acid at a suitable stage of the reaction workup process, they can be converted to the salts of said acids and treated in a manner appropriate to hydrazine salts and isolated as non-crystallized salts or crystalline salts.

In addition, isolation of a hydrazine free base in any physical form is not to be construed as a recommendation therefore nor as an exclusion of its salts, and, conversely, isolation of a hydrazine salt in any physical form is not to be interpreted as excluding the free base regardless of whether or not specific detailed transformation processes are presented.

In addition, precursor intermediates for the 1,2-disubstituted hydrazines can, themselves, be sufficiently basic to form acid addition salts. All of the aforementioned conditions of equivalency applying to the final hydrazine free bases and their corresponding salts apply also to the precursor intermediates regardless of the product form prepared in a reaction, isolated from the reaction or used in a subsequent reaction. Also, processes for interconversion described for the transformation of 1,2-disubstituted hydrazine bases and their salts are applicable to the basic precursor intermediates.

Specific details illustrative of the aforementioned salt-base interconversions for both precursor intermediates and the final hydrazine product are included as part of the process description in the following intermediate preparation sections.

Where physical constants are set forth for intermediate and final hydrazine products, it is to be understood that these apply to the compound as obtained, which may be in a condition less than that of absolute purity.

INTERMEDIATE PREPARATION 1

1-methyl-2-p-chlorobenzylhydrazine

Step A: Preparation of 1-methyl-1,2-dibenzyloxycarbonylhydrazine.—To a stirred mixture of methylhydrazine (5.75 g., 0.125 mole), anhydrous sodium carbonate (13.25 g., 0.125 mole), and anhydrous benzene (100 ml.) is added benzyloxycarbonyl chloride (42.6 g., 0.25 mole) over a 45 minute period with cooling in an ice bath. The viscous suspension formed is heated at reflux for 18 hours. Then ether (100 ml.) and water (100 ml.) are added to the cold reaction mixture and the organic layer separated and washed with saturated sodium carbonate solution, dilute hydrochloric acid, and water. The organic layer than is dried over anhydrous sodium sulfate, filtered and concentrated under reduced pressure to give 32 g. (81% yield) of 1-methyl-1,2-dibenzyloxycarbonylhydrazine as a white solid, M.P. 64–72° C. Recrystallization from cyclohexane raises the melting point to 66–71° C.

By this procedure, the 1,2-dibenzyloxycarbonyl hydrazine derivative of other unsubstituted or substituted aliphatic hydrocarbon groups attached to the 1-position of the hydrazine [the aliphatic hydrocarbon moiety being as described in (1) above] can be prepared. In addition, other 1,2-diacyl derivatives of these 1-substituted hydrazines can be prepared by this method.

The term, aliphatic hydrocarbon group, will be referred to merely as "aliphatic" hereinafter for the sake of simplicity.

Also by this procedure, the 1,2-dibenzyloxycarbonylhydrazine derivatives of the 1-arylhydrazines [the aryl moiety being as described in (2) above] or 1-aralkylhydrazines are prepared. This method also can be used to prepare 1,2-diacyl derivatives of hydrazines having a 1-heterocycle substituent [the hetero moiety being as described in (3) above]. In addition, other 1,2-diacyl derivatives of these hydrazines can be prepared by the above method wherein the acyl moiety is derived from an aliphatic acid or aromatic acid such as the acetyl, benzoyl and the like acyl groups.

Step B: Preparation of 1-methyl-2-p-chlorobenzyl-1,2-dibenzyloxycarbonylhydrazine.—A solution of 1-methyl-1,2-dibenzyloxycarbonylhydrazine (31.4 g., 0.10 mole) (from Step A) in dimethylformamide (175 ml.) is cooled to 10° C. and a 53.5% suspension of sodium hydride (4.50 g., 0.10 mole) in mineral oil is added slowly with stirring. After stirring for ½ hour, p-chlorobenzyl chloride (16.1 g., 0.10 mole) in dimethylformamide (25 ml.) is added dropwise over 10 minutes. The mixture is stirred at room temperature for 1 hour and on the steam bath for 5½ hours. Then most of the dimethylformamide is removed at steam bath temperature at 20–25 mm. pressure. The residual mixture is taken up in ether and water, the ether layer removed and washed with water, dried over anhydrous sodium sulfate, filtered, and concentrated to give 41.8 g. of 1-methyl-2-p-chlorobenzyl-1,2-dibenzyloxycarbonylhydrazine in the form of a yellow liquid. The crude oil is used in the following step without further purification.

The 1-methyl-1,2-dibenzyloxycarbonylhydrazine also can be alkylated under the same conditions using unsubstituted and substituted arylaliphatic halides. The substituents on the aryl moiety include alkoxy, hydroxy, alkyl, halo-alkyl, mono- or polyhalo, and the like. Any of the 1-aliphatic (aryl or heterocyclic)-1,2-diacylhydrazines of Step A can be alkylated by these various arylaliphatic halides to give the corresponding 1-aliphatic (aryl or heterocyclic)-2-substituted arylaliphatic-1,2-diacylhydrazines.

Step C: Preparation of 1-methyl-2-p-chlorobenzylhydrazine.—Crude 1-methyl-2-p-chlorobenzyl-1,2-dibenzyloxycarbonylhydrazine (44.3 g., ca. 0.1 mole) is stirred in 30–32% hydrogen bromide in acetic acid (100 ml.) for 1 hour at room temperature. The mixture then is cooled in ice and filtered yielding 17 g. of white solid, M.P. 135–143° C., which is washed thoroughly with ether. The product obtained is dissolved in water (25 ml.) and the solution saturated with solid potassium carbonate. The oil which separates is extracted into ether, the ether solution washed with water, dried, and concentrated under reduced pressure to give 3.83 g. (38% yield) of 1-methyl-2-p-chlorobenzylhydrazine in the form of a pale yellow liquid, $n_D^{25}$ 1.5518.

All of the products of Step B resulting from the alkylation of 1-alkyl(aryl or aralkyl)-1,2-diacyl hydrazines with unsubstituted or substituted arylaliphatic halides are hydrolyzed to the corresponding 1-alkyl(aryl or aralkyl)-2-(arylaliphatic)-hydrazines by this method.

INTERMEDIATE PREPARATION 2

1-methyl-2-heptylhydrazine dihydrochloride

A solution of 1-methyl-2-heptylidenehydrazine (28.5 g., 0.2 mole) in ethanol (150 ml.) and glacial acetic acid (25 ml.) is hydrogenated over platinum oxide at 25° C. and about 40 lbs. pressure. The theoretical amount of hydrogen is consumed in 3 hours and 50 minutes. The catalyst is removed by filtration and the filtrate concentrated under reduced pressure. The residual liquid then is made basic with excess sodium hydroxide and extracted with ether, the ether extract washed with water, dried and concentrated under reduced pressure at room temperature yielding 16.4 g. of yellow liquid. The liquid is distilled and 1-methyl-2-heptylhydrazine collected at 43–45° C. at 0.3 mm. pressure, $n_D^{25}$ 1.4392. A solution of this material in ether is treated with ethanolic hydrogen chloride to give 5.95 g. of the dihydrochloride which after recrystallization from acetic acid melts at 152–160° C.

The method described by Wiley et al. in J. Org. Chem., vol. 24, pp. 1925–1928 (1959) used for the preparation of 1-methyl-2-heptylidenehydrazine can be used for the preparation of the corresponding 1-methyl-2-alkylidenehydrazine from any alkanal (as butyraldehyde, hexaldehyde, isobutyraldehyde, cyclohexylaldehyde and the like) or alkanone (as methyl ethyl ketone, cyclohexanone, diisopropyl ketone, methyl amyl ketone and the like). In addition, other aliphatic hydrocarbon (aryl or heterocyclic) hydrazines [all as defined in (1), (2), and (3) above] can be reacted with an alkanal or alkanone to form the corresponding 1-aliphatic (aryl or heterocyclic)-2-alkylidene hydrazine. Hydrogenation by the procedure described in Intermediate 2, using platinum oxide, palladium on charcoal, or other catalyst, converts the alkylidene to an alkyl group and the corresponding 1,2-disubstituted hydrazine is obtained.

INTERMEDIATE PREPARATION 3

1-methyl-2-carboxymethylhydrazine hydrochloride

Step A: Preparation of 1 - methyl - 2 - ethoxycarbonylmethyl-1,2-dibenzyloxycarbonylhydrazine.—A solution of 1-methyl-1,2-dibenzyloxycarbonylhydrazine (31.4 g., 0.10 mole) in dimethylformamide (175 ml.) is treated with sodium hydride suspension (4.50 g., 0.10 mole) and ethyl bromoacetate (16.70 g., 0.10 mole) as in the procedure of Intermediate Preparation 1, Step B, yielding 37.5 g. of 1 - methyl - 2 - ethoxycarbonylmethyl - 1,2 - dibenzyloxycarbonylhydrazine in the form of a yellow liquid. This material is used without further purification in Step B.

Other halo esters, such as propyl bromoacetate, isobutyl chloroacetate, methyl α-bromopropionate, ethyl α-bromobutyrate, and others also can be used in this reaction. In addition, any of the 1-aliphatic(aryl or heterocyclic)-1,2-diacylhydrazines mentioned in Intermediate Preparation 1, Step A, can be alkylated by any of these α-haloalkanoic acid esters yielding the corresponding 1 - aliphatic - 2 - alkoxycarbonylalkyl - 1,2 - diacylhydrazine, 1-aryl-2-alkoxycarbonylalkyl-1,2-diacylhydrazine, or 1-heterocyclic-2-alkoxycarbonylalkyl-1,2-diacylhydrazine.

Step B: Preparation of 1 - methyl - 2 - carboxymethylhydrazine hydrochloride.—A solution of 1-methyl-2-ethoxycarbonylmethyl - 1,2-dibenzyloxycarbonylhydrazine (37.5 g., ca. 0.094 mole) in 30–32% hydrogen bromide in acetic acid (150 ml.) is stirred at room temperature for 3 hours. The solution then is concentrated under reduced pressure and the residue is dissolved in water (100 ml.) and the solution made basic with saturated sodium carbonate solution. The basic solution is washed with ether and acidified with excess hydrochloric acid. The acidic solution is concentrated to dryness and the solid residue extracted with boiling 2-propanol. Filtration of the cold solution gives 2.66 g. of the hydrochloride salt of 1-methyl-2-carboxymethylhydrazine, M.P. 160–164° C. (dec.). Concentration of the filtrate gives another 12.5 g. of less pure product.

All of the products of Step A resulting from the alkylation with alkyl α-haloalkanoates of 1-aliphatic-, aryl or heterocyclic-1,2-diacylhydrazines [all as defined in (1), (2) or (3) above] are hydrolyzed by this method to yield the corresponding 1-aliphatic(aryl or heterocyclic)-2-carboxyalkylhydrazines.

INTERMEDIATE PREPARATION 4

1-methyl-2-(2-diethylaminoethyl)hydrazine dihydrochloride

Step A: Preparation of 1-methyl-2-(2-diethylaminoethyl)-1,2-dibenzyloxycarbonylhydrazine.—A solution of 1-methyl-1,2-dibenzyloxycarbonylhydrazine (31.4 g., 0.10 mole) (from Intermediate Preparation 1, Step A) in dimethylformamide (175 ml.) is treated with sodium hydride suspension (4.50 g., 0.10 mole) and diethylaminoethyl chloride (13.56 g., 0.10 mole) as in the procedure of Intermediate Preparation 1, Step B, yielding 37.0 g. of 1-methyl - 2 - (2 - diethylaminoethyl) - 1,2 - dibenzyloxycarbonylhydrazine in the form of a viscous yellow liquid. This material is used without further purification in the following step.

In addition, the 1-methyl-1,2-dibenzyloxycarbonylhydrazine can be alkylated with other aliphatic hydrocarbon groups having a basic substituent [as defined in (1) above] by the same procedure.

Likewise, any 1-aliphatic(aryl or heterocyclic)-1,2-dibenzyloxycarbonylhydrazine, such as mentioned in Intermediate Preparation 4, Step A, can be alkylated with agents of the type described in the preceding paragraph, to yield 1-aliphatic(aryl or heterocyclic)-2-disubstituted-aminoaliphatic-1,2-dibenzyloxycarbonylhydrazine.

Also, the other 1-aliphatic(aryl or arylaliphatic)-1,2-diacylhydrazines, such as described in Intermediate Preparation 1, Step A, are alkylated by the aforementioned alkylating agents to yield 1-aliphatic(aryl or arylaliphatic) - 2 - disubstituted - aminoalkyl - 1,2 - diacylhydrazines.

Step B: Preparation of 1-methyl - 2 - (2-diethylaminoethyl)hydrazine dihydrochloride.—A solution of 1-methyl-2-(2-diethylaminoethyl) - 1,2 - dibenzyloxycarbonylhydrazine (10.0 g., ca. 0.0242 mole) in concentrated hydrochloric acid (50 ml.) is stirred at 40 to 50° C. for 4 hours and then on a steam bath at 90–100° C. for an additional 2 hours. The solution is cooled, washed with ether, and the acidic aqueous layer concentrated under reduced pressure to give 6.0 g. of 1-methyl-2-(2-diethylaminoethyl)hydrazine dihydrochloride as a viscous, colorless gum. On standing several days the gum crystallized. Recrystallization from 2-isopropanol gives 3.47 g. (66% yield) of the product in the form of a white hydroscopic solid, M.P. 107–109° C.

All the 1-aliphatic (aryl or heterocyclic)-2-tertiary-aminoalkyl-1,2-diacylhydrazines prepared as described in Step A are hydrolyzed by this procedure to the corresponding 1-aliphatic(aryl or heterocyclic)-2-disubstituted-aminoalkylhydrazines.

INTERMEDIATE PREPARATION 5

1-methyl-2-(4-carboxybenzyl)hydrazine

Step A: Preparation of 1-methyl-2-(4-methoxycarbonylbenzyl) - 1,2 - dibenzyloxycarbonylhydrazine.—A solution of 1-methyl-1,2-dibenzyloxycarbonylhydrazine (31.4 g., 0.10 mole) prepared as described in Intermediate Preparation 1, Step A, in 175 ml. of dimethylformamide is treated with a suspension of sodium hydride (4.50 g., 0.10 mole) and then with p-methoxycarbonylbenzyl bromide (22.9 g., 0.10 mole) according to the procedure of Intermediate Preparation 1, Step B, yielding 44.2 g. of 1-methyl-2-(4-methoxycarbonylbenzyl) - 1,2 - dibenzyloxycarbonylhydrazine as a viscous yellow liquid. This material is used without further purification.

The acylating agent may include the ortho and meta isomers of the methoxycarbonylbenzyl halide and also other ester derivatives such as p-ethoxycarbonylbenzyl bromide or other alkoxycarbonylbenzyl bromide or alkoxycarbonylalkylbenzyl halide compounds. Any of the 1-aliphatic(aryl or heterocyclic)1,2-diacylhydrazines of Intermediate Preparation 1, Step A, can be alkylated by these benzyl halides to form the corresponding 1-aliphatic(aryl or heterocyclic) - 2 - (alkoxycarbonylbenzyl)-1,2-diacylhydrazines.

Step B: Preparation of 1-methyl-2-(4-carboxybenzyl)-hydrazine.—A solution of crude 1-methyl-2-(4-methoxycarbonylbenzyl) - 1,2 - dibenzyloxycarbonylhydrazine (35.1 g., ca. 0.076 mole) in 30–32% hydrogen bromide in acetic acid (150 ml.) is stirred at room temperature for 3 hours. Then ether (250 ml.) is added and the solid which separates is filtered and washed well with ether. The solid is dissolved in water (150 ml.) and the solution then made basic by adding an excess of solid sodium carbonate. The basic sodium carbonate solution is concentrated to dryness under reduced pressure and the 1-methyl-2-(4-carboxybenzyl)hydrazine extracted from the inorganic salts with boiling 2-propanol. The solid obtained is used without further purification.

All of the alkylation products of Step A are hydrolyzed by this method to the corresponding 1-aliphatic(aryl or heterocyclic)-2-carboxybenzylhydrazines.

INTERMEDIATE PREPARATION 6

1-isopropyl-2-(3-methoxyphenyl)hydrazine

Step A: Preparation of 1-isopropylidene-2-(3-methoxyphenyl)hydrazine.—A mixture of 3-methoxyphenylhydrazine hydrochloride (17.46 g., 0.10 mole), sodium acetate (8.2 g., 0.10 mole) and acetone (11.6 g., 0.20 mole) in methanol (150 ml.) and water (50 ml.) is heated at reflux for 3 hours. The solution then is concentrated under reduced pressure at room temperature and the oil which separates is extracted into ether. The ether extract is washed with water, dried and concentrated under reduced pressure to give 16.7 g. of 1-isopropylidene-2-(3-methoxyphenyl)hydrazine as a yellow liquid, $n_D^{25}$ 1.5843.

Replacement of the acetone in this reaction by other alkanals and alkanones of the type described in relation to Intermediate Preparation 2 results in the formation of the corresponding 1-alkylidene-2-(3-methoxyphenyl)hydrazine.

The 3-methoxyphenylhydrazine in this reaction also can be replaced by other unsubstituted or substituted aryl hydrazines, the aryl moiety being as defined in (2) above or it can be replaced by unsubstituted or substituted heterocyclic hydrazines, the heterocyclic substituent being as defined in (3) above to yield the corresponding 1-alkylidene-2-arylhydrazine or 1-alkylidene-2-heterocyclic hydrazine.

Step B: Preparation of 1-isopropyl - 2 - (3-methoxyphenyl)hydrazine.—A solution of 1-isopropylidene-2-(3-methoxyphenyl)hydrazine (16.5 g., 0.093 mole) in tetrahydrofuran (40 ml.) is added to a stirred suspension of lithium aluminum hydride (3.53 g., 0.093 mole) in tetrahydrofuran (100 ml.) at 0° C. under nitrogen over a 15 minute period. Stirring is continued at reflux for 2 hours. The mixture then is cooled to 0° C. and ether saturated with water (100 ml.) added cautiously, followed by the addition of 2.5 N sodium hydroxide (15 ml.) and water (30 ml.). The mixture is filtered and the solid obtained washed with ether. The filtrate is concentrated under reduced pressure at 70 to 80° C. and residual liquid taken up in ether, washed with water, dried, and concentrated to give 15.0 g. of 1-isopropyl-2-(3-methoxyphenyl)hydrazine as a pale yellow liquid.

All the 1-alkylidene-2-aryl(or hetero)hydrazines prepared in Step A are reduced to the 1-alkyl-2-aryl(or hetero)hydrazines by this procedure which can be modified, if desired, by using catalytic reduction in the presence of platinum oxide, palladium on charcoal or other usual catalyst as described in Intermediate Preparation 2.

INTERMEDIATE PREPARATION 7

1-isopropyl-2-(4-carboxyphenyl)hydrazine

A solution of 1-isopropylidene-2-(4-carboxyphenyl) hydrazine (22.3 g., 0.116 mole) in ethanol (300 ml.) is prepared with warming. The solution is hydrogenated over platinum oxide at 25° C. and about 32 lbs. pressure. After 4 hours and 15 minutes the theoretical weight of hydrogen is consumed and the catalyst then is removed by filtration, and the filtrate concentrated under reduced pressure to give 22.9 g. of pale yellow solid, M.P. 112–140° C. Four recrystallizations from 2-propanol give 6.10 g. (27% yield) of 1-isopropyl-2-(4-carboxyphenyl)hydrazine as a white solid, M.P. 174.5–176.5° C.

INTERMEDIATE PREPARATION 8

1-isopropyl-2-(2-hydroxyethyl)hydrazine 1-isopropylidene-2-(2-hydroxyethyl)hydrazine (99.2 g., 0.855 mole) is dissolved in ethanol (150 ml.) and then hydrogenated in the presence of platinum oxide at 25° C. and about 40 pounds pressure. The theoretical amount of hydrogen is absorbed in about 36.5 hours whereupon the catalyst is removed by filtration and the filtrate concentrated under reduced pressure at room temperature to give 94 g. of colorless liquid. The liquid is distilled through a 10 inch Vigreux column and about 50 g. of 1-isopropyl-2-(2-hydroxyethyl)hydrazine is collected at 103–105° C. at 18 mm. pressure $n_D^{25}$ 1.4612.

INTERMEDIATE PREPARATION 9

1-methyl-2-[2-(4-morpholinyl)ethyl]hydrazine hydrochloride

Step A: Preparation of 1-methyl-1,2-diformylhydrazine.—To 552.4 g. (12.0 moles) of formic acid cooled in an ice bath, there is added 138.2 g. (3.0 moles) of methyl hydrazine with stirring over a 1.5 hour period and with maintenance of a nitrogen atmosphere. The solution is heated at reflux for 16 hours and then concentrated under reduced pressure. The residual liquid solidifies to a white solid which is recrystallized from 200 ml. of isopropyl alcohol to give 1-methyl-1,2-diformylhydrazine (193.0 g., 63% yield) which melts at 57–60° C.

In the same way, the 1,2-diformyl derivatives of other 1-aliphatic (aryl or heterocyclic)hydrazines can be prepared by reacting the hydrazine with excess formic acid at reflux temperature.

Step B: Preparation of 1-methyl-2-[2-(4-morpholinyl)-ethyl]-1,2-diformylhydrazine.—Under a nitrogen atmosphere, 28.9 g. (0.722 mole) of a 59.8% dispersion of sodium hydride in mineral oil is added to a cooled solution of 73.7 g. (0.722 mole) of 1-methyl-1,2-diformylhydrazine (from Step A) in 900 ml. of dimethylformamide. A solution of 108.2 g. (0.722 mole) of 2-(4-morpholinyl)ethyl chloride (prepared by alkali treatment of its hydrochloride salt) in 100 ml. of dimethylformamide is then added. The mixture is stirred at reflux for 16 hours and then filtered and concentrated under reduced pressure. The residual syrup is dissolved in 200 ml. of water and the insoluble oil is removed by ether extraction. Concentration of the aqueous solution yields 163 g. of 1-methyl-2-[2-(4-morpholinyl)ethyl] - 1,2 - diformylhydrazine as an oil.

The 1,2-diformyl derivatives of all the aliphatic(aryl or heterocyclic)hydrazines of Step A may be alkylated in this same way with N-(β-chloroethyl)morpholine.

Also, the 2-(4-morpholinyl)ethyl chloride may be replaced by other alkylating agents such as other disubstituted amino aliphatic halides, especially chlorides, the disubstituted amino aliphatic moiety being as described in (1) above.

Step C: Preparation of 1-methyl-2-[2-(4-morpholinyl)-ethyl]hydrazine hydrochloride salt.—1-methyl-2-[2-(4-morpholinyl)ethyl]-1,2-diformylhydrazine (77.5 g., 0.361 mole) (from Step B) is dissolved in a mixture of 175 ml. of concentrated hydrochloric acid and 1900 ml. of methyl alcohol. The resulting solution is heated at reflux for 1 hour and then concentrated under reduced pressure to yield 85.0 g. of 1-methyl-2-[2-(4-morpholinyl)ethyl]-hydrazine hydrochloride as a non-crystalline viscous gum.

All of the 1,2-disubstituted-1,2-diformylhydrazines described in Step B can be hydrolyzed by this procedure.

INTERMEDIATE PREPARATION 10

1-methyl-2-[2-(N-benzyl-N-methylamino)ethyl]hydrazine

Step A: Preparation of 1-methyl-2-[2-(N-benzyl-N-methylamino)ethyl]-1,2-diformylhydrazine.—By replacing the 2-(4-morpholinyl)ethyl chloride of Intermediate Preparation 9, Step B, with a molecular equivalent amount of 2-(N-methyl-N-benzylamino)ethyl chloride and carrying out the reaction in essentially the same manner and isolating the product in the same way, there is obtained, in greater than 90% yield, 1-methyl-2-[2-(N-benzyl-N-methylamino)ethyl]-1,2-diformylhydrazine as a viscous liquid.

Step. B: Preparation of 1-methyl-2-[2-(N-benzyl-N-methylamino)ethyl]hydrazine.—1-methyl-2 - [2 - (N-benzyl-N-methylamino)ethyl] - 1,2 - diformylhydrazine (60 g.) from Step A is dissolved in a mixture of 1,200 ml. of methyl alcohol and 110 ml. of concentrated hydrochloric acid. The mixture is heated under reflux for 1 hour and then concentrated in vacuo to yield a syrupy residue. Sodium hydroxide (10 N. 100 ml.) is added, carbonate, and the oil which separates is extracted into carbonate, and the oil which separates s extracted into 300 ml. of ethyl ether. The extract is dried over anhydrous potassium carbonate and the ether is evaporated in vacuo. The residual liquid is distilled at 0.7–1.0 mm. to yield 1 - methyl-2 - [2-(N-benzyl - N-methylamino) ethyl]hydrazine boiling at 145–152° C., $n_D^{25}$ 1.5218.

INTERMEDIATE PREPARATION 11

1-phenyl-2-[2-(4-morpholinyl)ethyl]hydrazine hydrochloride

Step A: Preparation of 1-phenyl-2-[2-(4-morpholinyl)-ethyl]-1,2-diformylhydrazine.—A solution of 65.7 g. (0.40 mole) of 1-phenyl-1,2-diformylhydrazine in 650 ml. of anhydrous dimethylformamide is cooled in ice and stirred under nitrogen as 16.0 g. (0.40 mole) of a 59.8% sodium hydride-mineral oil dispersion is added in small portions. The viscous suspension of sodium salt which forms is stirred for ½ hour. Then 59.85 g. (0.40 mole) of 2-(4-morpholinyl)ethyl chloride in 100 ml. of dimethylformamide is added and the mixture heated at reflux with stirring for 3½ hours under nitrogen. The cooled reaction mixture is filtered and the filtrate concentrated under reduced pressure to give 118 g. of 1-phenyl-2-[2-(4-morpholinyl)ethyl] - 1,2-diformyl-hydrazine as a residual oil.

All the 1,2-diformyl derivatives of the aliphatic aryl or heterocyclic substituted hydrazines such as those of Intermediate Preparation 9, Sept A, can be alkylated by this procedure.

Also the 2-(4-morpholinyl)ethyl chloride can be replaced by other alkylating agents such as other disubstituted aminoaliphatic halides to form corresponding 1-aliphatic(aryl or heterocyclic) - 2 - (tertiaryaminoaliphatic)hydrazines.

Step B: Preparation of 1-phenyl - 2-[2-(4-morpholinyl)ethyl]hydrazine hydrochloride.—A solution of 55.4 g. (0.2 mole) of the crude 1-phenyl-[2-(4-morpholinyl) ethyl]-1,2-diformylhydrazine from Step A in 1200 ml. of methanol containing 110 ml. of concentrated hydrochloric acid is heated at reflux for 1¼ hours. The mineral oil which separates is removed and the solution is concentrated under reduced pressure at steam bath temperature. The moist solid which is obtained is recrystallized from methanol to give 39.4 g. (67% yield) of 1-phenyl-2-[2-(4-morpholinyl)ethyl] - hydrazine hydrochloride as a pale yellow solid, M.P. 162.5–163.5° C.

All of the 1,2-disubstituted-1,2-diformylhydrazine of Step A can be hydrolyzed to the respective hydrazine by this procedure.

INTERMEDIATE PREPARATION 12

1-methyl-2-(2-diethylamino-1-methylethyl)hydrazine

Step A: Preparation of 1-methyl-2-(2-diethylamino-1-methylethylidene)hydrazine.—To 64.6 g. (0.5 mole) of diethylaminoacetone is added 27.6 g. (0.6 mole) of methylhydrazine dropwise with stirring and ice cooling. After the addition is complete, the reaction is stirred for 30 minutes at 90° C. The excess methylhydrazine is removed under reduced pressure and the residual liquid is distilled at 0.5 mm. and 1-methyl-2-(2-diethylamino-1-methylethylidene)hydrazine (63.0 g., 80% yield; $n_D^{25}$ 1.1463) is collected at its boiling point of 49–50° C.

Step B: Preparation of 1-methyl-2-(2-diethylamino-1-methylethylidene) - 1 - acetylhydrazine.—A solution of 63.0 g. (0.4 mole) of 2 - (2-diethylamino - 1 - methylethylidene)hydrazine (from Step A) in 200 ml. of chloroform is cooled to 5° C. and a solution of 39.2 g. (0.5 mole) of acetyl chloride in 50 ml. of chloroform is added dropwise with stirring and external cooling. After 2 hours the addition is complete and the solution is stirred at 24° C. for 16 hours. It is then cooled to 10° C. and 100 ml. of 10 N sodium hydroxide is added slowly. The chloroform phase is separated, dried and concentrated under reduced pressure. The residual liquid is distilled at 1.0–1.5 mm. pressure, and 53.0 g. (67% yield) of 1 - methyl - 2 - (2-diethylamino - 1-methylethylidene)-1-acetylhydrazine boiling at 104–106° C. with $n_D^{25}$ 1.4756 is collected.

The acetyl chloride may be replaced by other acylating agents such as alkanoyl halides and anhydrides (propionic, butyric) and aroyl halides (benzoic).

Step C: Preparation of 1-methyl-2-(2-diethylamino-1-methylethyl) - 1 - acetylhydrazine.—1 - methyl - 2 - (2-diethylamino-1-methylethylidene)-1-acetylhydrazine (52.5 g., 0.263 mole, from Step B) dissolved in 200 ml. of glacial acetic acid is hydrogenated at a pressure of 40 pounds per square inch at 25° C. using 0.3 g. of platinum oxide as catalyst. After 25 hours the theoretical quantity of hydrogen is taken up, the catalyst is removed by filtration and the filtrate is concentrated under reduced pressure at 90° C. The 1-methyl-2-(2-diethylamino-1-methylethyl)-1-acetylhydrazine which remains as a residual liquid is used in Step D. All the alkanoyl and aroyl derivatives of Step B are reduced by the process of Step C.

Step D: Preparation of 1-methyl-2-(2-diethylamino-1-methylethyl)hydrazine.—The 1 - methyl - 2 - (2 - diethylamino-1-methylethyl)-1-acetylhydrazine from Step C is dissolved in 250 ml. of 24% hydrochloric acid and the solution is heated at reflux under nitrogen for 8 hours. The solution is concentrated under reduced pressure and the residual viscous syrup is treated with 150 ml. of 10 N sodium hydroxide and 100 ml. of ether. The ether is separated and the aqueous phase is extracted with another 100 ml. of ether. The extracts are combined and the ether is evaporated. Distillation of the residual liquid at 15 mm. yields 11.0 g. of 1-methyl-2-(2-diethylamino-1-methylethyl)hydrazine, $n_D^{25}$ 1.4448, which distills at 73–78° C.

All the alkanoyl and aroyl derivatives of Step C are deacylated by the procedure of Step D.

INTERMEDIATE PREPARATION 13

1-methyl-2-(3-dimethylamino-2,2-dimethylpropyl) hydrazine hydrochloride

Step A: Preparation of 1-methyl-2-(3-dimethylamino-2,2-dimethylpropylidene)hydrazine.—By replacing the diethylaminoacetone of Intermediate Preparation 12, Step A, by an equimolecular quantity of 3-dimethylamino-2,2-dimethylpropionaldehyde and following substantially the same reaction and workup described therein, there is obtained 1 - methyl-2-(3-dimethylamino-2,2-dimethylpropylidene)hydrazine which is collected at its boiling point of 47–48° C. at 0.4 mm. $n_D^{25}$ 1.4677.

Step B: Preparation of 1-methyl-2-(3-dimethylamino-2,2 - dimethylpropylidene)-1-acetylhydrazine.—The product of Step A is acetylated as described in Intermediate Preparation 12, Step B, to give 1-methyl-2-(3-dimethylamino-2,2-dimethylpropylidene) - 1 - acetylhydrazine with boiling point of 80–82° C. at 0.5 mm. upon distilling the product in vacuo; $n_D^{25}$ 1.4800.

Step C: Preparation of 1-methyl-2-(3-dimethylamino-2,2 - dimethylpropyl) - 1 - acetylhydrazine.—The product of Step B is hydrogenated using platinum oxide catalyst by essentially the same procedure described in Intermediate Preparation 12, Step C. The residue obtained after evaporation of the reaction solvent is treated with alkali and the product is extracted into ether. The ether is evaporated and the remaining liquid is distilled at 0.2 mm. to give 1-methyl-2-(3-dimethylamino-2,2-dimethylpropyl)-1-acetylhydrazine which is collected at its boiling point of 80–82° C., $n_D^{25}$ 1.4657.

Step D: Preparation of 1-methyl-2-(3-dimethylamino-2,2 - dimethylpropyl)hydrazine hydrochloride. — The product of Step C is subjected to the acidic hydrolytic procedure of Intermediate Preparation 12, Step D. The acidic reaction mixture is then concentrated under reduced pressure to yield the residual 1-methyl-2-(3-dimethylamino-2,2-dimethylpropyl)hydrazine in the form of its hydrochloride salt which is not crystallized.

INTERMEDIATE PREPARATION 14

1-methyl-2-(4-dimethylamino-1-methylbutyl)hydrazine

Step A: Preparation of 1-methyl-2-(4-dimethylamino-1-methylbutylidene)hydrazine.—By replacing the diethylaminoacetone of Intermediate Preparation 12, Step A, with 5-dimethylamino-2-pentanone in equivalent quantity and using essentially identical reaction conditions and procedures, there is obtained in 91% yield, 1-methyl-2-(4-dimethylamino-1-methylbutylidene)hydrazine which distills at 65–68° C. at 0.8 mm.; $n_D^{25}$ 1.4687.

Step B: Preparation of 1-methyl-2-(4-dimethylamino-1 - methylbutylidene) - 1 - acetylhydrazine hydrochloride.—The product from Step A is acetylated by the same process described for Intermediate Preparation 12, Step B. After the reaction is complete the chloroform and excess acetyl chloride is removed by evaporation in vacuo to yield a residue of 1-methyl-2-(4-dimethylamino-1-methylbutylidene)-1-acetylhydrazine as a hydrochloride salt.

Step C: Preparation of 1-methyl-2-(4-dimethylamino-1 - methylbutyl - 1 - acetylhydrazine hydrochloride.—The product from Step B is hydrogenated in acetic acid solution using platinum oxide catalyst and the same conditions described in Intermediate Preparation 12, Step C. After filtration to remove the catalyst the reaction solvent is removed by evaporation in vacuo and 1-methyl-2-(4-dimethylamino-1-methylbutyl)-1-acetyl-hydrazine is obtained as a hydrochloride salt in the form of a gum.

Step D: Preparation of 1-methyl-2-(4-dimethylamino-1-methylbutyl)hydrazine.—The product from Step C is hydrolytically deacetylated by the process described for Intermediate Preparation 12, Step D. The product is isolated from the reaction mixture as described therein and 1-methyl-2-(4-dimethylamino-1 - methylbutyl)hydrazine is obtained which has a boiling point of 69–71° C. at 3.0 mm.; $n_D^{25}$ 1.4517.

INTERMEDIATE PREPARATION 15

1,2-bis[2-(4-morpholinyl)ethyl]hydrazine hydro chloride

Step A: Preparation of 1,2-bis[2-(4-morpholinyl)ethyl]

1,2-diformylhydrazine.—A solution of 8.8 g. (0.10 mole) of 1,2-diformylhydrazine in 300 ml. of dimethylformamide is cooled to 5° C. and 8.02 g. (0.20 mole) of a 59.8% dispersion of sodium hydride in mineral oil is added in small portions with stirring. The resulting suspension is heated at reflux for 15 minutes and 29.9 g. (0.20 mole) of N-(2-chloroethyl)morpholine is then added. Heating under reflux is continued for 10 hours, the reaction is cooled and filtered and the filtrate is concentrated under reduced pressure. The residual oil is dissolved in 150 ml. of water and the solution is extracted with ether. The aqueous solution then is concentrated under reduced pressure to give 1,2-bis[2-(4-morpholinyl)ethyl]-1,2-diformylhydrazine as a viscous liquid.

Step B: Preparation of 1,2-bis[2-(4-morpholinyl)ethyl]-hydrazine hydrochloride.—The 1,2-bis[2-(4-morpholinyl)ethyl]-1,2-diformylhydrazine from Step A is dissolved in 600 ml. of anhydrous methanol and 55 ml. of concentrated hydrochloric acid is added. The solution is heated under reflux for one hour and then concentrated under reduced pressure to give the hydrochloride salt of 1,2-bis[2-(4-morpholinyl)ethyl]-hydrazine which is not crystallized.

INTERMEDIATE PREPARATION 16

1-methyl-2-(1-methyl-3-piperidyl)hydrazine

Step A: Preparation of 1-methyl-2-(1-methyl-3-piperidylidene)hydrazine.—Methylhydrazine (6.44 g., 0.14 mole) is added to a solution of 14.7 g. (0.13 mole) of 1-methyl-3-piperidone in 50 ml. of methyl alcohol. The solution is heated under reflux for 20 minutes and then concentrated under reduced pressure to give a residue of 16.4 g. of 1-methyl-2-(1-methyl-3-piperidylidene)hydrazine.

Step B: Preparation of 1-methyl-2-(1-methyl-3-piperidyl)-hydrazine.—The 1-methyl-2-(1-methyl-3-piperidylidene)-hydrazine from Step A is dissolved in 20 ml. of tetrahydrofuran and added to a suspension of 5.3 g. (0.14 mole) of lithium aluminum hydride in 100 ml. of tetrahydrofuran. The mixture is stirred at reflux for 3 hours and then cooled. Water (26 ml.), sodium hydroxide (4.5 ml., 20% solution) and ether (50 ml.) are added and the mixture is filtered. The ether layer in the filtrate is separated, dried and concentrated under reduced pressure. The residual liquid is distilled at 20 mm. and 1.4 g. of 1-methyl-2-(1-methyl-3-piperidyl)hydrazine boiling at 96–97° C. is collected.

INTERMEDIATE PREPARATION 17

1-methyl-2-(3-quinuclidinyl)hydrazine hydrochloride

Step A: Preparation of 1-methyl-2-(3-quinuclidinylidene hydrazine hydrochloride.—3-quinuclidinonehydrochloride (16.16 g., 0.10 mole) is suspended in 50 ml. of methyl alcohol and 5.52 g. (0.12 mole) of methylhydrazine is added. The reaction mixture is heated under reflux in a nitrogen atmosphere for 20 minutes and then concentrated under reduced pressure to give an essentially quantitative yield of 1-methyl-2-(3-quinuclidinylidene) hydrazine hydrochloride as a crystalline solid residue. Recrystallization from ethanol-ether mixture yields product with melting point of 190–191° C.

Step B: Preparation of 1-methyl-2-(3-quinuclidinyl) hydrazine hydrochloride.—The product from Step A, 1 - methyl-2-(3-quinuclidinylidene)hydrazine hydrochloride (17.7 g., 0.093 mole) is dissolved in 150 ml. of acetic acid and hydrogenated at a pressure of 40 pounds per square inch at 25° C. using a platinum catalyst. When reduction is complete, the catalyst is removed by filtration and the filtrate concentrated under reduced pressure to yield a residual oil. A solution of ethanolic hydrogen chloride (50 ml., 6 N) is added to the residue and, when crystallization is complete, the product is collected by filtration. Recrystallization from a methanol-ether mixture yields 1 - methyl-2-(3-quinuclidyl)hydrazine hydrochloride (10 g.) having a melting point of 240–241° C.

INTERMEDIATE PREPARATION 18

1-methyl-2-[2-(dimethylaminomethyl)-cyclohexyl] hydrazine hydrochloride

Step A: Preparation of 1-methyl-2-[2-(dimethylaminomethyl)cyclohexylidene]hydrazine hydrochloride.—By replacing the 3-quinuclidinone hydrochloride of Intermediate Preparation 17, Step A, with an equivalent amount of 2 - (dimethylaminomethyl)cyclohexanone hydrochloride and carrying out the reaction essentially as described therein, there is obtained a 90% yield of 1-methyl-2-[2-(dimethylaminomethyl)cyclohexylidene]hydrazine hydrochloride which melts at 97–108° C.

Step B: Preparation of 1-methyl-2-[2-(dimethylaminomethyl)cyclohexylidene] - 1 - acetylhydrazine hydrochloride.—The product from Step A is acetylated by the procedure described in Intermediate Preparation 14, Step B, and 1-methyl-2-[2-(dimethylaminomethyl)cyclohexylidene]1-acetylhydrazine hydrochloride is obtained as a non-crystalline solid.

Step C: Preparation of 1-methyl-2-[2-dimethylaminomethyl)cyclohexyl] - 1-acetylhydrazine hydrochloride.— Catalytic hydrogenation of 22.5 g. of the product from Step B by the method of Intermediate Preparation 12, Step C, and workup of the reaction by the procedure of Intermediate Preparation 14, Step C, yields 21 g. of 1 - methyl - 2 - [2-dimethylaminomethyl)cyclohexyl]-1-acetyl-hydrazine as a non-crystalline hydrochloride salt.

Step D: Preparation of 1-methyl-2-[2-(dimethylaminomethyl)cyclohexyl]hydrazine hydrochloride.—The product from Step C is subjected to the acidic hydrolytic procedure of Intermediate Preparation 12, Step D, and the product is isolated by the procedure of Intermediate Preparation 13, Step D, to give 1-methyl-2-[2-(dimethylhaminomethyl)cyclohexyl]hydrazine as a hydrochloride salt which is not crystallized.

INTERMEDIATE PREPARATION 19

1-methyl-2-(2-dimethylaminocyclohexyl)hydrazine

Step A: Preparation of 1-methyl-2-(2-dimethylaminocyclohexylidene)hydrazine.—By replacing the 1-methyl-3-piperidone of Intermediate Preparation 16, Step A, with an equivalent amount of 2-dimethylaminocyclohexanone and, using essentially the same reaction conditions, there is obtained 1-methyl-2-(2-dimethylaminocyclohexylidene)-hydrazine.

Step B: Preparation of 1-methyl-2-(2-dimethylaminocyclohexyl)hydrazine.—The product of Step A is reduced with lithium aluminum hydride by the procedure of Intermediate Preparation 16, Step B. Using substantially the same reaction conditions and reaction workup methods to give 1-methyl-2-(2-dimethylaminocyclohexyl)hydrazine which distills at 93–94 C. at 6 min.; $n_D^{25}$ 1.4856.

INTERMEDIATE PREPARATION 20

1-methyl-2-(2-diethylamino-1-phenylethyl)hydrazine

Step A: Preparation of 1-methyl-2-(2-(diethylamino-1-phenylethylidene)hydrazine.—By replacing the 1-methyl-3-piperidone of Intermediate Preparation 16, Step A, with an equivalent amount of α-diethylaminoacetophenone and, using essentially the same reaction conditions and workup procedure, there is otbained 1-methyl-2(2-diethyl-amino-1-phenylethylidene)hydrazine, $n_D^{25}$ 1.5543.

Step B: Preparation of 1-methyl-2-(2-diethylamino-1-phenylethyl)hydrazine.—The product of Step A is dissolved in tetrahydrofuran and reduced with lithium aluminum hydride by the procedure of Intermediate Preparation 16, Step B. The product, 1-methyl-2-(2-diethylamino-1-phenylethyl)hydrazine, $n_D^{25}$ 1.5473, is isolated as described therein but is not distilled.

INTERMEDIATE PREPARATION 21

1-methyl-2-(2-diethylamino-2-phenylethyl)hydrazine

Step A: Preparation of 1-methyl-2-(2-diethylamino-2- phenylethylidine)hydrazine.—By replacing the 1-methyl-3-piperidone of Intermediate Preparation 16, Step A, with an equivalent quantity of 2-diethylamino-2-phenylacetaldehyde and heating the reaction mixture under reflux for 3 hours, 1-methyl-2-(2-diethylamino-2-phenylethylidene)hydrazine is obtained as an oil after evaporation of the reaction solvent in vacuo.

Step B: Preparation of 1-methyl-2-(2-diethylamino-2-phenylethyl)hydrazine.—The product of Step A is reduced with lithium aluminum hydride by the procedure of Intermediate Preparation 16, Step B. The product is isolated from the reaction mixture by substantially the same procedure described in Step B, Intermediate Preparation 16, and on distillation at 0.4 mm. pressure, 1-methyl-2-(2-diethylamino-2-phenylethyl)hydrazine boils at 80–90° C. and is collected.

INTERMEDIATE PREPARATION 22

1-isopropyl-2-[4-(N,N-dimethylaminomethyl)phenyl]-hydrazine

Step A: Preparation of 4-(N,N-dimethylaminomethyl)-phenylhydrazine.—A solution of 30.04 g. (0.2 mole) of 4-(N,N-dimethylaminomethyl)aniline in 300 ml. of 8 N hydrochloric acid is cooled to −5 to 0° C. and a cold solution of 13.8 g. (0.2 mole) of sodium nitrite in 50 ml. of water is added slowly under the surface of the solution with stirring over a 35 minute period. Stirring at 0° C. is continued for another 30 minutes and then the solution is added to a stirred solution of 161.0 g. (0.715 mole) of stannous chloride dihydrate in 100 ml. of concentrated hydrochloric acid at 0° C. The mixture is stirred for 3 hours while the temperature is maintained at 0–10° C. Solid potassium hydroxide is added in small portions until the reaction mixture is basic, at the same time holding the temperature below 50° C. The mixture is filtered and the filtrate is extracted with three 100 ml. portions of ether. The extracts are combined and the ether is evaporated to yield a viscous liquid which is distilled in vacuo. The product, 4-(N,N-dimethylaminomethyl)phenylhydrazine has a boiling point of 118–123° C. at 0.6 mm., $n_D^{25}$ 1.5736, and 16.3 g. (49.3% yield) is collected.

Step B: Preparation of 1-isopropylidene-2-[4-(N,N-dimethylaminomethyl)phenyl]hydrazine.—The product of Step A, 4-(N,N-dimethylaminomethyl)phenylhydrazine (16.0 g., 0.097 mole) is dissolved in 8.7 g. (0.15 mole) of acetone and the solution is heated on the steam bath for 30 minutes. The excess acetone is evaporated under reduced pressure and the residue is distilled. The 1-isopropylidene-2-[4-(N,N-dimethylaminomethyl)phenyl]hydrazine has a boiling point of 133–134° C. at 0.3 mm. $n_D^{25}$ 1.5686, and 10.0 g. is collected.

Step C: Preparation of 1-isopropyl-2-[4-(N,N-dimethylaminomethyl)phenyl]hydrazine.—A solution of 25.6 g. (0.125 mole) of isopropylidene-2-[4-N,N-dimethylaminomethyl)phenyl] - hydrazine (prepared by the method of Step B) in 150 ml. of anhydrous ether is added to a stirred suspension of 5.7 g. (0.15 mole) of lithium aluminum hydride in 350 ml. of ether over 30 minute period. The resulting suspension is stirred for 16 hours at 25° C. and then for 3 hours under reflux. The mixture is cooled and placed under a nitrogen atmosphere and 38 ml. of 40% aqueous potassium hydroxide is added over a 25 minute period. The ether layer is separated and the aqueous mixture is extracted with a fresh portion of ether. The ether extracts are combined, dried over anhydrous potassium carbonate, filtered and evaporated in vacuo to give an oily residue which solidifies. After recrystallization from hexane (protected from atmospheric moisture), 10.0 g. of 1-isopropyl-2-[4-(N,N-dimethylaminomethyl)phenyl]hydrazine having a melting point of 49–51.5° C. is obtained.

In Table IV and Table V are disclosed additional examples of 1,2-disubstituted hydrazines synthesized by methods outlined in the detailed intermediate preparations procedures. Reference is made to a specific detailed intermediate preparation and appropriate step therein for each reaction involved in the synthesis of the hydrazine products of the tables. The halo atom designated as X in the alkylating agent $R^1X$ is, in all cases, chlorine. All hydrazine products, $$\begin{matrix} RN\text{---}NH^1 \\ | \quad | \\ H \quad H \end{matrix}$$

are obtained in the physical form and salt or free base condition described in the tables and are used as such in the subsequent reaction with dihalomaleic acid or anhydride to yield pyridazinedione compounds of this invention. All conditions of equivalency applying to the physical forms and salts and free bases of the hydrazines and their precursors in the detailed intermediate preparations apply also to the hydrazines and their precursors disclosed in Table IV and Table V.

All the hydrazines described specifically in the intermediate preparations and in the tables as well as those described generally in connection with the proceeding intermediate preparations can be converted to the pyridazinedione products of this invention by the methods hereinbefore described particularly in the examples or by other well known methods.

TABLE IV.—INTERMEDIATE PREPARATIONS $$\begin{matrix} RN\text{---}NH \\ | \quad | \\ H \quad H \end{matrix} \xrightarrow{\text{acylation}} \begin{matrix} RN\text{---}NH \\ | \quad | \\ Ac \quad Ac \end{matrix} \xrightarrow{R^1X} \begin{matrix} RN\text{---}NR^1 \\ | \quad | \\ Ac \quad Ac \end{matrix} \xrightarrow{H^+} \begin{matrix} RN\text{---}NR^1 \\ | \quad | \\ H \quad H \end{matrix}$$

| Intermediate No. | R | R¹ | Ac | Acylation Intermediate Prep. No. | R—NH / Ac Ac Physical Properties | R¹X → Intermediate Prep. No. | RN—N—R¹ / Ac Ac Physical Property | H+ → Intermediate Prep. No. | R—N—N—R¹ / H H Physical Property |
|---|---|---|---|---|---|---|---|---|---|
| 23 | —C₆H₅— | —CH₂CH₂N(C₂H₅)₂ | C=O / O / CH₂C₆H₅ | 1A | M.P. 96.5–97.5° C. | 4 step A | Viscous liquid. | 4B | Crystalline hydrochloride salt. |
| 24 | F—C₆H₄— | —CH₂CH₂N⟨O⟩ | —CHO | 9A | M.P. 90–91.5° C. | 11A | Brown oil. | 10B | Oily liquid. |
| 25 | Cl-C₆H₄— | —CH₂CH₂N⟨O⟩ | —CHO | 9A | M.P. 114–116° C. | 11A | Liquid. | 10B | Do. |
| 26 | OCH₃-C₆H₄— | —CH₂CH₂N⟨O⟩ | —C+O | 9A | Viscous oil. | 11A | Viscous oil. | 10B | Liquid. |

TABLE V.—INTERMEDIATE PREPARATIONS $$\begin{array}{c}CH_3N\text{———}NH \\ | \quad\quad | \\ CHO \quad CHO\end{array} \xrightarrow{R^1X} \begin{array}{c}CH_3N\text{———}N-R^1 \\ | \quad\quad\quad | \\ CHO \quad CHO\end{array} \xrightarrow{H^+} \begin{array}{c}CH_3-N-N-R^1 \\ | \quad | \\ H \quad H\end{array}$$

| Intermediate No. | R¹ | Intermediate Prep. No. | $CH_3N\text{—}N\text{-}R^1$ with CHO CHO — Physical Properties | Intermediate Prep. No. | $CH_3\text{-}N\text{-}NR^1$ with H H — Physical Properties |
|---|---|---|---|---|---|
| 27 | —CH₂CH₂N(CH₃)₂ | 9B | Viscous liquid | 9C | Hydrochloride salt; M.P., 129–130° C., dec. |
| 28 | —CH₂CH₂N[CH(CH₃)₂]₂ | 9B | Yellow liquid | 10B | Liquid B.P., 65–67° C. at 1.9 mm; $n_D^{25}$, 1.4532. |
| 29 | —CH₂CH₂N(C₄H₉)₂ | 9B | Oily liquid | 9C | Hydrochloride salt (not crystallized). |
| 30 | —CH₂CHCH₂N(CH₃)₂ (CH₃) | 9B | Yellow liquid | 10B | Liquid B.P., 82–84° C. at 18 mm. $n_D^{25}$, 1.4487. |
| 31 | —CH₂CHN(C₂H₅)₂ (CH₃) | 9B | Oily liquid | 9C | Hydrochloride salt (not crystallized). |
| 32 | —CH₂CH₂CH₂N(CH₃)₂ | 9B | Non-cyrstalline gum | 9C | Do. |
| 33 | —CH₂CH₂CH₂N(C₂H₅)₂ | 9B | Liquid | 10B | Liquid B.P., 50–58° C. at 0.5 mm; $n_D^{25}$, 1.4554. |
| 34 | —CH₂CH₂N⟨  ⟩ | 9B | Oily liquid | 10B | Liquid. |
| 35 | —CH₂CH₂N⟨  ⟩S | 9B | Liquid | 9C | Hydrochloride salt; M.P., 150–158° C. |
| 36 | —CH₂CH₂N⟨  ⟩SO₂ | 9B | Syrup | 9C | Hydrochloride salt; M.P., 154–156° C. |
| 37 | —CH₂CH₂CH₂N⟨  ⟩N—CH₃ | 9B | Non-cyrstalline gum | 9C | Crystalline hydrochloride salt. |
| 38 | —H₂C⟨  ⟩N—CH₃ | 9B | ...do... | 9C | Hydrochloride salt (not crystallized). |
| 39 | —CH₂CH₂—⟨  ⟩ with CH₃ | 9B | Viscous syrup | 9C | Hydrochloride salt (not crystallized). |
| 40 | —CH₂CH₂N—CH₂—⟨  ⟩ with CH₃ | 9B | Viscous liquid | 10B | Liquid B.P., 111–122° C. at 1 mm. |
| 41 | —CH₂CH₂CH₂NCH₂—⟨  ⟩ with CH₃ | 9B | Liquid | 10B | Liquid B.P., 99–110° C. at 0.3 mm. Avg. $n_D^{25}$, 1.5199. |
| 42 | —CH₂CH₂—N⟨  ⟩N—CH₃ | 9B | Yellow oil | 9C | Hydrochloride salt, M.P., 145–147° C. |
| 43 | —CH₂CH₂CH₂N⟨  ⟩O | 9B | Brown oil | 9C | Hydrochloride salt (not crystallized). |

What is claimed is:

1. A process wherein dihalomaleic acid or dihalomaleic acid anhydride is caused to react with a hydrazine of the formula HNR—NHR¹ or an acid salt or a diformyl, dibenzoyl or dicarbobenzyloxy derivative thereof thus forming a 1-R-2-R¹-4,5-dihalo - 1,2 - dihydro-3,6-pyridazinedione wherein R and R¹ is
  loweralkyl or
  substituted loweralkyl wherein the substituents are
   hydroxy
   diethylaminoacetoxy
   acetoxy
   haloacetoxy
   morpholinyl
   thiomorpholinyl
   dioxothiomorpholinyl
   diloweralkylamino
   carboxy
   phenyl
   piperidinyl
   N-methyl-N-phenylamino
   N-methyl-N-benzylamino
   N-methylpiperidyl
   loweralkoxycarbonyl
   halophenyl
   carboxyphenyl
  phenyl or substituted phenyl, wherein the substituents are
   carboxy
   loweralkoxy
   halo
   diethylaminoethoxycarbonyl
   dimethylaminomethyl and
   cyclohexyl.

2. A process wherein dihalomaleic acid or dihalomaleic acid anhydride is caused to react with

HNR—HNR¹ or an acid salt or a diformyl, dibenzoyl or dicarbobenzyloxy derivative thereof to form 1-R-2-R¹-4,5-dihalo-1,2-dihydro-3,6-pyridazinedione where R and R¹ respectively is a loweralkyl group.

3. A process as claimed in claim 2 wherein the hydrazine reactant and end product R is a lower alkyl and R¹ is a lower alkyl group in which at least one of its hydrogen atoms is replaced by an N-containing substituent.

4. A process wherein dichloromaleic acid or dichloromaleic acid anhydride is caused to react with 1-methyl-2 [2-(4-morpholinyl)ethyl] hydrazine or an acid salt or a diformyl, dibenzoyl or dicarbobenzyloxy derivative thereof to form 1-methyl-2-[2-(4-morpholinyl)ethyl]-4,5-dichloro-1,2-dihydro-3,6-pyridazinedione.

5. A process as claimed in claim 2 wherein the hydrazine reactant is 1-methyl-2-(3-dimethylamino - 2 - methylpropyl)hydrazine or an acid salt or diformyl, dibenzoyl, or dicarbobenzyloxy derivative thereof and wherein the maleic acid reactant is 1,2-dichloro maleic acid or 1,2-dichloro maleic acid anhydride, thus forming 1 - methyl-2-(3-dimethylamino-2-methylpropyl) - 4,5 - dichloro-1,2-dihydro-3,6-pyridazinedione.

6. A process wherein dichloromaleic acid or dichloromaleic acid anhydride is caused to react with 1,2-dimethylhydrazine or an acid salt or diformyl, dibenzoyl or dicarbobenzyloxy derivative thereof thus forming 1,2-dimethyl-4,5-dichloro - 1,2 - dihydro-3,6-pyridazinedione.

7. A process wherein dichloromaleic acid or dichloromaleic acid anhydride is caused to react with 1-methyl-2-phenylhydrazine or an acid salt or diformyl, dibenzoyl or dicarbobenzyloxy derivative thereof thus forming 1-methyl - 2 - phenyl-4,5-dichloro-1,2-dihydro-3,6-pyridazinedione.

8. A process wherein dichloromaleic acir or dichloromaleic acid anhydride is caused to react with 1-methyl-2-[3-(N-methyl-N-benzylamino)propyl]hydrazine or an acid salt or diformyl, dibenzoyl or dicarbobenzyloxy derivative thereof thus forming 1-methyl-2-[3-(N-methyl-N-benzylamino)propyl]-4,5-dichloro - 1,2 - dihydro-3,6-pyridazinedione.

9. 1-R-2-R$^1$-4,5-dihalo-1,2-dihydro - 3,6 - pyridazinedione wherein R$^1$ is (di-loweralkylamino)lower alkyl and R is lower alkyl.

10. 1-methyl - 2 - (3-dimethylamino-2-methylpropyl)-4,5-dichloro-1,2-dihydro-3,6-pyridazinedione.

11. 1-lower alkyl - 2 - (4-morpholinyl-lower alkyl)-4,5-dihalo-1,2-dihydro-3,6-pyridazinedione.

12. 1-methyl - 2 - [2-(4-morpholinyl)ethyl]-4,5-dichloro-1,2-dihydro-3,6-pyridazinedione.

13. 1-lower alkyl-2-(N-lower alkyl-N-benzylamino-lower alkyl)-4,5-dihalo-1,2-dihydro-3,6-pyridazinedione.

14. 1 - methyl - 2 - [3-(N-methyl-N-benzylamino) propyl] - 4,5 - dichloro-1,2-dihydro-3,6-pyridazinedione.

15. 1,2-di-lower alkyl-4,5-dihalo - 1,2 - dihydro-3,6-pyridazinedione.

16. 1,2-di-methyl - 4,5-dichloro-1,2-dihydro-3,6-pyridazinedione.

17. 1-lower alkyl - 2 - phenyl-4,5-dihalo-1,2-dihydro-3,6-pyridazinedione.

18. 1-methyl - 2 - phenyl-4,5-dichloro-1,2-dihydro-3,6-pyridazinedione.

19. 1-R-2-R$^1$-4,5-dihalo - 1,2 - dihydro-3,6-pyridazinedione wherein R and R$^1$ is
    loweralkyl or
    substituted loweralkyl wherein the substituents are
        hydroxy
        diethylaminoacetoxy
        acetoxy
        haloacetoxy
        morpholinyl
        thiomorpholinyl
        dioxothiomorpholinyl
        diloweralkylamino
        carboxy
        phenyl
        piperidinyl
        N-methyl-N-phenylamino
        N-methyl-N-benzylamino
        loweralkoxycarbonyl
        N-methylpiperidyl
        halophenyl
        carboxyphenyl
    phenyl or substituted phenyl, wherein the substituents are
        carboxy
        loweralkoxy
        halo
        diethylaminoethoxycarbonyl
        dimethylaminomethyl
        cyclohexyl and
        N-methylpiperidyl and the acid addition and quaternary ammonium salts of the compounds wherein R and R$^1$ contain a basic substituent.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,934,536 | 4/1960 | Druey et al. | 260—250 |

ALEX MAZEL, Primary Examiner.

JOSE TOVAR, Assistant Examiner.

U.S. Cl. X.R.

260—243, 246, 250; 424—246, 248, 250